United States Patent
Satapathy et al.

(10) Patent No.: US 8,233,448 B2
(45) Date of Patent: Jul. 31, 2012

(54) APPARATUS AND METHOD FOR SCHEDULER IMPLEMENTATION FOR BEST EFFORT (BE) PRIORITIZATION AND ANTI-STARVATION

(75) Inventors: Durga Prasad Satapathy, Ashburn, VA (US); Sungki Park, Ashburn, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 453 days.

(21) Appl. No.: 12/545,959

(22) Filed: Aug. 24, 2009

(65) Prior Publication Data

US 2011/0044262 A1  Feb. 24, 2011

(51) Int. Cl.
*H04W 4/00* (2009.01)
(52) U.S. Cl. .............. 370/329; 370/229; 455/452.2
(58) Field of Classification Search .............. None
See application file for complete search history.

(56) References Cited

U.S. PATENT DOCUMENTS

| | | | |
|---|---|---|---|
| 7,388,838 B2 * | 6/2008 | Abraham et al. | 370/235 |
| 8,149,771 B2 * | 4/2012 | Khivesara et al. | 370/329 |
| 2004/0033806 A1 * | 2/2004 | Daniel et al. | 455/450 |
| 2009/0207731 A1 * | 8/2009 | Carlson et al. | 370/232 |
| 2011/0116370 A1 * | 5/2011 | Trac et al. | 370/230.1 |
| 2011/0249554 A1 * | 10/2011 | Chamas et al. | 370/230 |

* cited by examiner

*Primary Examiner* — Chi Pham
*Assistant Examiner* — Mohammad Adhami
(74) *Attorney, Agent, or Firm* — Pillsbury Winthrop Shaw Pittman LLP

(57) ABSTRACT

In various embodiments, a method, computer-readable storage medium, and apparatus for scheduling prioritized best effort (BE) service flows through a wireless network base station includes a controller coupled to a memory. If any one of a plurality of BE service flows are congested, a minimum reserved traffic rate (MRTR) algorithm is used by the controller to ensure that at least a highest priority BE service flow is maintained at least at an associated MRTR. If none of the plurality of BE service flows are congested, a maximum sustained traffic rate (MSTR) algorithm is used by the controller to enable the highest priority BE service flow to be set to at least an associated MSTR before lower priority service flows are increased. If none of the plurality of BE service flows are congested and each service flow is at their associated MSTR, the controller is configured to distribute any excess bandwidth to each service flow in accordance with an initial set of priority BE traffic flow ratios.

13 Claims, 17 Drawing Sheets

FIG. 1 (BACKGROUND)

FIG. 2A (BACKGROUND)

FIG. 2B (BACKGROUND)

FIG. 3 (BACKGROUND)

FIG. 5 (BACKGROUND)

APPARATUS AND METHOD FOR SCHEDULER IMPLEMENTATION FOR BEST EFFORT (BE) PRIORITIZATION AND ANTI-STARVATION

BACKGROUND

This disclosure is generally related to an apparatus and method for improving the scheduling of user traffic in a network mapped to "Best Effort" (BE) Quality of Service (QoS) categories. In particular, this disclosure is related to an apparatus and method for providing a minimum reserved traffic rate (MRTR) for BE communications in a congested network environment. More particularly, this disclosure is related to Code Division Multiple Access (CDMA) and Worldwide Interoperability for Microwave Access ("WiMAX") technologies under the IEEE 802.16e standard and WiMAX Forum System Profile 1.X, for example, in which a base station (BS) schedules uplink and downlink traffic to multiple mobile stations (MS).

FIG. 1 depicts the architecture of an exemplary WiMAX network implemented in accordance with various aspects of IEEE Standard 802.16e. In FIG. 1, BS 110 may communicate with one or more Mobile Stations/Subscriber Stations (MS/SS) 130a-130n over network 120 via an associated communication channel 140a-140n. The terms "SS" and "MS" may be used interchangeably, although it is recognized that MS implies the use of mobility enhancements. MS/SS 130a-130n may be relatively fixed or immobile terminal equipment, or may be equipment that includes the mobility functions of a MS, e.g., a cell phone or laptop computer traveling in an automobile or airplane. Various factors such as the existence of ambient interference around the SS or BS, movement of the SS, and other factors may degrade or otherwise alter the channel condition of the communication channel, making the use of HARQ desirable to ensure reliable communications over channels 140a-140n. HARQ uplink Acknowledgement Channels (ACKCH) 150a-150n allow each MS/SS 130a-130n to acknowledge packet receipt to the BS by use of a HARQ signal transmission over a dedicated HARQ ACK channel. Channel Quality Indicator (CQI) channels 160a-160n provide a path for the MS or SS to identify the relative quality of the communication channel to BS 110 using known techniques.

WiMAX systems present various traffic scheduling challenges. For example, the quality of the wireless channel is typically different for different users and randomly changes with time (on both slow and fast time scales). Further, wireless bandwidth is considered to be a scarce resource that needs to be used efficiently (i.e., you can not overprovision the wireless link). In addition, an excessive amount of interference and higher error rates are typically experienced. Scheduling decides the modulation coding scheme (MCS) and affects error rate, and error rate affects the choice of MCS. In general, mobility complicates resource allocation.

Generally, system scheduling considerations include total available bandwidth; service flow specific scheduling policy; service flow QoS parameters; data queue backlog; Request/Grant Mechanisms (e.g., contention, polling, piggyback); connection air link quality; impact of burst allocation on PHY layer (i.e., burst concurrency, interference property, and memory/processing limitations); and the use of Acknowledgement Repeat Request (ARQ) and/or Hybrid ARQ (H-ARQ).

In a variable wireless link, throughput, latency/delay, and transmission errors vary much more widely over a wireless connection because of constantly changing radio signal conditions and extensive digital radio processing. Standard internet protocols, designed for use over a more stable wire-based connection, are not well-suited to handle these variations. For shared wireless resources, the same wideband radio channel must be shared among many user sessions and each user session may involve many different types of data streams and protocols. Some applications require bursty, time-sensitive, small-packet data transmissions, while other applications require long, error-sensitive large-packet data streams. To provide acceptable QoS, the network must be able to identify and combine many different types of traffic from many different users without compromising the performance of any of the different user applications.

To support multimedia applications, the WiMAX IEEE 802.16e standard defines five types of data delivery service flows for downlink (DL) flows and five corresponding scheduling services for uplink (UL) flows: UGS—Unsolicited Grant Service, with constant bit-rate services (CBR); rtPS—Real Time Polling Service, with variable bit-rate, but sensitive to delay; ertPS—Extended Real Time Polling Service, for VoIP with silence suppression, similar to CBR with gaps; nrtPS—Non-real Time Polling Service, time insensitive, but require a minimum bandwidth allocation; and BE—Best Effort. Uplink is differentiated from downlink because uplink flows (except UGS) involve some form of request/grant mechanism for resource allocations. Table I summarizes the various WiMAX data service types.

TABLE I

WiMAX Data Delivery Services

| DL data delivery service | UL scheduling service | Targeted traffic |
| --- | --- | --- |
| Unsolicited grant service (UGS) | Unsolicited grant service (UGS) | Constant bit rate (CBR) services, TDM services |
| Extended real-time Variable Rate (ERT-VR) | Extended real-time polled service (ertPS) | VoIP with silence suppression/activity detection |
| Real-time Variable Rate (RT-VR) | Real-time polled service (rtPS) | Streaming audio & video |
| Non-real-time Variable Rate (NRT-VR) | Non-real-time polled service (nrtPS) | File transfers |
| Best Effort (BE) | Best Effort (BE) | Web browsing, e-mail, etc. |

Each of these service flow types has a different QoS requirements and is designed to support different types of traffic streams. The order of priority given to services while transmitting is generally as follows: UGS>ertPS>rtPS>nrtPS. However, the particular scheduling mechanism is generally left to be defined by proprietary implementations.

Since the BS governs resource scheduling, uplink resources must either be allocated automatically on a periodic basis, or requested individually as needed by the MS. Resources for UGS and ertPS service flows are periodically allocated according to an unsolicited grant interval (UGI) defined for each service flow. The ertPS service flows can also dynamically request additional resources, i.e., more throughput, as described below. Resources for rtPS, nrtPS and BE service flows must be individually requested (usually triggered by data in the MS buffer.) The BS can automatically offer dedicated uplink opportunities for specific ertPS, rtPS and nrtPS service flows to request bandwidth on a periodic basis (unsolicited polling interval). The ertPS, rtPS, nrtPS and BE service flows can also request bandwidth during a shared uplink opportunity, subject to contention. Once UL resources have been granted, requests for additional UL resources can be "piggybacked" on existing allocations.

While WiMAX defines the QoS parameters for each service flow type, it does not specify how the scheduler uses these parameters to allocate air interface resources. Radio Access Network (RAN) suppliers have employed different scheduling algorithms. Not all suppliers directly consider all the QoS parameters when allocating air interface resources. In some cases, suppliers assume a particular scheduling algorithm will minimize latency or jitter, without actually measuring and adjusting allocations to achieve the targeted performance.

A variety of conventional standalone mechanisms are used to provide different levels of control over user performance. Call Admission Control (CAC) used for non-BE flows (e.g., "real-time" voice or data) can be used to set some resources aside for BE. Traffic priority parameters can be used for intra-user distinction. Thresholds for minimum reserved traffic rate (MRTR) and maximum sustainable traffic rate (MSTR) are also used to control throughput. However, these conventional approaches have drawbacks.

FIGS. 2A and 2B illustrate conventional concepts of assigning different throughput parameters (related to available bandwidth) for each of three BE user classes, i.e., Gold, Silver, and Bronze users. These throughput—parameters include a maximum sustainable traffic rate (MSTR) for each of the three user classes, i.e., MSTR_G, MSTR_S, and MSTR_B (FIG. 2A), and minimum reserved traffic rate (MRTR) for each of the three user classes, i.e., MRTR_G, MRTR_S, and MRTR_B (FIG. 2B). Gold class service typically may involve the highest user fee and have the highest targeted bandwidth. Silver class service involves a medium level of user fee, and less bandwidth than Gold class service. Bronze class service may involve the lowest fee with generally good bandwidth, but less bandwidth than both Gold and Silver class service.

There are various WiMAX scheduling concepts. Conventionally, BE is the lowest priority class, with no minimum rate guarantees, hence the term "best effort". However, most service provider revenues typically come from traffic served by BE. Current network traffic schedulers allow BE user performance to progressively degrade as system load increases. While inter-user prioritization is possible allowing an arbitrarily defined "Gold" class to get better performance relative to "Silver" and "Bronze" classes, conventional gold user performance continues to degrade with the rest of the user classes as system load increases, without any option for the service provider to set a floor to performance degradation. Performance degradation can occur due to network congestion (outside of BS control), or due to additional load from newly admitted BE users (no call admission control is used for BE).

Inter-Class Scheduling allocates resources among different types of service flows based on strict priority. Resources for control and management traffic are allocated before user traffic, and resources for real-time service flows (UGS, ertPS) are allocated before resources for non-real-time (nrtPS) and best effort (BE) service flows. In contrast, Intra-Class Scheduling allocates resources among service flows of the same type differently depending upon the type of flow. Resources for control messages are typically allocated before management messages, resources for real-time service flows are typically allocated relative to the QoS parameters assigned to the service flow and adjusted accordingly to attempt to achieve the desired QoS for all service flows, and resources for nrtPS and BE service flows are typically allocated based on the user's signal conditions and the relative priority assigned to the users' traffic. Generally, all throughput—rates are limited to a maximum throughput—rate, but may burst above this rate (to a maximum burst rate) if resources are available. In addition, HARQ/ARQ can also be enabled/restricted/disabled per service flow to reduce latency and jitter.

The WiMAX Access Service Network (ASN) employs admission control and sophisticated resource scheduling to manage, but not guarantee, the QoS. The ASN is a set of network functions that include network discovery and selection of the preferred Connectivity Service Network/Network Service Provider (CSN/NSP), network entry with IEEE 802.16e-2005 based layer 2 connectivity and Authentication, Authorization, and Accounting (AAA) proxy, Relay function for IP Connectivity, radio resource management, multicast and broadcast control, intra-ASN mobility, foreign agent functionality for inter-ASN mobility, paging and location management, accounting assistance, data forwarding, service flow authorization, QoS, and Admission Control & Policing. The WiMAX ASN also marks traffic to enable other networks/elements to provide QoS consistent with the air interface.

WiMAX uses scheduling to determine QoS. All traffic is classified into separate service flows, as mentioned above. Each service flow is assigned different QoS parameters that govern minimum and maximum throughput—rates, maximum latency and jitter, etc. A resource scheduler in the BS allocates air interface resources differently for each service flow type. As mentioned above, traffic within the same service flow type may be further differentiated by traffic priority values assigned to users. The resource scheduler also dynamically accounts for users' signal conditions when allocating non-real-time resources. In general, allocations to users in better signal conditions are weighted so they receive more resources (to maximize overall sector throughput), but an operator can adjust fairness to ensure users in poor signal conditions receive reasonable throughput. The WiMAX Radio Access Network (RAN) marks traffic according to the service flow type to enable consistent end-to-end QoS across multiple networks.

WiMAX also uses Admission Control for QoS. Admission control considers the QoS requirements for real-time service flows to determine whether they can be met with available air interface resources before activating the service flow. Available air interface resources can either be statically defined or dynamically calculated based on recent PHY (layer 1 of the OSI 7-layer model) performance. Admission control is performed by the BS during network entry and re-entry for statically-provisioned service flows (e.g. initial service flows). Admission control is also performed by the BS in response to dynamic BS-initiated or MS-initiated requests to create service flows. Further, Admission control is performed by the BS during handovers. Admission control can be used to limit the amount of total air interface resources that are consumed by real-time service flows. Since real-time service flows are allocated resources before non-real-time and best effort service flows, this feature prevents real-time traffic from "starving" best effort traffic.

So-called traffic "starvation" is similar in effect to program deadlock. Two or more programs become deadlocked together when each of them is waiting for a resource occupied by another program in the same set. Similarly, one or more network service flows are in starvation when each of them is waiting for system resources that are used by service flows that may or may not be in the same set that are starving. Such "starvation" is obviously an undesirable situation in a communications network. Most current vendors use CAC to limit starvation for BE users.

FIG. 3 illustrates a conventional allocation between BE and non-BE traffic in an uncongested BE traffic condition. For example, reference symbol "A" represents the current throughput—(bandwidth allocation) of BE traffic, e.g., Gold BE service flow 1 (SF1) is maintained at least at the MRTR_G level; Silver BE service flow 2 (SF2) is maintained at least at the MRTR_S level; and Bronze BE service flow 2 (SF2) is maintained at least at the MRTR_B level. Reference symbol "B" represents the current loading of non-BE traffic (e.g., "real-time" traffic). Reference symbol "X" represents an operator-configurable bandwidth (BW) allocation reserved for the various user classes of BE service. The term "(100-X)" represents a percentage of BW reserved for non-BE service flows to which CAC is applied.

FIG. 4 illustrates an allocation between BE and non-BE traffic in a congested BE traffic condition in which additional BE users (represented by reference symbol "C") are allowed to join the network, resulting in a reduction in BW per Gold user (represented by reference symbol "D") and degraded performance for Gold users 1 and 2.

FIG. 5 illustrates conventional problems with the allocation of BW to different user classes. For example, in Case 1, an undesirable situation is encountered in which a Gold user's throughput—falls below the MSTR_G level, while Silver and Bronze BE users throughput—remains at their respective MSTR_S and MSTR_B levels. Case 2 illustrates another undesirable situation in which excessive Gold user BW is allocated to provide throughput—above the MSTR_G level, resulting in Silver and Bronze users falling below their respective MSTR_S and MSTR_B levels. Service providers and their customers would prefer to avoid both of these undesirable situations.

What is needed is a network traffic scheduler implementation in which principles of inter-user traffic priority are combined with BE QoS categories, CAC, and anti-starvation to allow desired BE user behavior. What is further needed is a scheduling apparatus and method that allows a service provider to selectively configure the scheduler to vary between a simple weighted round-robin scheduling process and a modified process that sets lower bounds on throughput—for higher priority BE users, and which allows the service provider to make tradeoffs between different service classes or users in the same BE category such that BE user performance degradation with increasing system load is prevented or reduced.

SUMMARY

The apparatus and method of this disclosure provide various features, functions, and capabilities as discussed more fully in the detailed description, and as summarized below. For example, this disclosure provides a novel and useful scheduler implementation for use in a communications network, with particular application in wireless telecommunication systems such as those adhering to IEEE 802.16 (WiMAX), 3GPP, 3GPP2, etc. communication standard specifications, but the inventive concept disclosed herein is not necessarily limited to use with WiMAX systems. For example, various embodiments of this disclosure may be implemented in computer software and loaded into a processor arranged in a wireless network Base Station (BS), e.g., a WiMAX BS.

In one or more embodiments, a traffic scheduler sets aside a predetermined amount (e.g., X %) of capacity for BE flows. Once the total capacity estimated for all other flows reaches (100-X) % of system capacity, taking into account a maximum sustained traffic rate (MSTR), no other non-BE flow will be admitted. This "X factor" may be operator configurable. While BE flows can use available resources outside the predetermined, operator configurable X %, non-BE flows are not allowed to use the X % set aside for BE flows.

In one or more embodiments, traffic priority parameter settings will allow an operator to selectively weight at least three classes of BE services designated as "Gold", "Silver", and "Bronze" service classes. For example, the G:S:B ratios could be set to 3:2:1. Other settings may be desired depending on system requirements, e.g., 8:2:1, or some other ratio that meets the system traffic requirements. Minimum rate settings (MRTR) are defined for Gold, Silver and Bronze BE users. These minimum rate settings may also be operator configurable. In one or more aspects of an embodiment, "Zero" ("0") settings for these parameters allow the traffic scheduler to be implemented as a simple weighted round-robin scheduler, where the ratios can be operator/vendor defined (e.g. based on MSTR, MRTR, plan rate etc.). Round-robin scheduling (RR) is one of the simplest scheduling algorithms for processes in an operating system, which assigns time slices to each process in equal portions and in circular order, handling all processes without priority. Round-robin scheduling is both simple and easy to implement, and starvation-free.

In one or more aspects of this disclosure, as the system becomes more congested and Gold user throughput—falls to the Gold MRTR, the scheduler may dynamically adjust the ratios (G:S:B) to ensure that all existing Gold users keep throughput—(related to available bandwidth, BW) at the MRTR. This may be implemented at the expense of throughput—of lower priority (i.e., Silver/Bronze) users or other Gold priority users, if needed. With an increase in congestion, the same process may be repeated for Silver BE users (and then for Bronze BE users).

In one or more embodiments, the traffic scheduler may be configured to measure BE throughput—during an operator configurable window timer period to ensure that the MRTR is met. For example, the scheduler can be configured to set ratios to 3:0:0 for a certain time period (e.g., configurable window, in units of number of frames) until the BE throughput—is greater than MRTR, and then the ratios may be readjusted to maintain MRTR.

The scheduler may also offer an operator setting which, when enabled, allows the call admission module to block new Gold users, and a variable subset of the lower priority classes (i.e., Silver and/or Bronze) whenever the throughput—for Gold users falls to MRTR levels. The same feature may be implemented for all other BE user classes as well.

In other aspects of this disclosure, and with a continued increase in congestion beyond the point where the Bronze (or lowest user class of service) users fall to their respective MRTR, the scheduler may be configured to provide the operator with two choices:

1) use an operator definable set of ratios to allow rates to be reduced for all users (each falling below MRTR). On recovery, scheduler will increase rates for all users in the same ratio.

2) Reduce rates for the lower priority users, supporting the higher priority users at their MRTR, as feasible.

In one or more embodiments, and in an extreme case, the system may be left with all available resources shared between just Gold users. On recovery, the scheduler may be configured to increase rates for higher priority users first. When the system is lightly loaded, the scheduler will ensure the Gold user MSTR is satisfied first, then the MSTR of Silver and Bronze users are satisfied, in their order of priority. Any excess capacity may then be distributed by the initial ratios set by the operator.

In one or more embodiments, a method of scheduling and prioritizing traffic in a data communications network includes the steps of providing a base station operably coupled to a traffic scheduler, wherein the traffic scheduler is configured to establish at least first and second best effort (BE) user classes (BE1, BE2), for prioritizing and scheduling associated BE traffic flows in the network, wherein the BE1 user class is assigned a higher priority for traffic throughput—than the BE2 user class; assign a first maximum sustainable traffic rate threshold value (MSTR_1) that establishes an upper bound of bandwidth to be allocated to each user in the BE1 user class and assign a first minimum reserved traffic rate threshold value (MRTR_1) that establishes a lower bound of bandwidth to be allocated to each user in the BE1 user class; assign a second maximum sustainable traffic rate threshold value (MSTR_2) that establishes an upper bound of bandwidth to be allocated to each user in the BE2 user class and assign a second minimum reserved traffic rate threshold value (MRTR_2) that establishes a lower bound of bandwidth to be allocated to each user in the BE2 user class; and establish an initial ratio (BE1:BE2) of throughput—for the BE1 user class to throughput—for the BE2 user class. The method may further include determining, for each of the BE1 and BE2 user classes, whether associated BE traffic has a traffic throughput—greater than the respective MRTR_1 or MRTR_2 threshold values. If the associated BE traffic has a throughput—greater than the respective MRTR_1 or MRTR_2 threshold value for all associated service class users such that the network BE traffic is in an uncongested state, the traffic scheduler may be configured to proportionally allocate any residual bandwidth to the BE1 and BE2 user class traffic in accordance with the initial ratio (BE1:BE2) if all classes of BE user traffic are at least at their associated maximum sustained throughput—rate (MSTR) threshold values, or increase allocated bandwidths for all BE1 users in the BE1 user class to a traffic rate at least equal to the MSTR_1 level before increasing a traffic rate for any lower priority service class user. If the associated BE traffic has a throughput less than or equal to the respective MRTR_1 or MRTR_2 threshold value for any associated service class user such that the network BE traffic is in a congested state, the traffic scheduler may be configured to estimate a traffic throughput—degradation and, if the BE1 service class traffic rate is less than the MRTR_1 threshold value for any BE1 service user, increase any deficient BE1 user traffic rate by at least a portion of the estimated throughput—degradation sufficient to provide BE1 user traffic at least at the MRTR_1 level and reduce lower priority service user traffic as necessary or, if the BE1 service class traffic rate is at least at the MRTR_1 threshold value for all BE1 service users and if the BE2 service class traffic rate is less than the MRTR_2 threshold value for any BE2 service user, maintain the BE1 service class traffic rates and increase any deficient BE2 user traffic rate by at least a portion of the estimated throughput degradation sufficient to provide BE2 user traffic at least at the MRTR_2 level and reduce any lower priority service user traffic as necessary.

In another embodiment, a traffic scheduler for use in a base station of a wireless network includes a traffic prioritization module configured to prioritize best effort (BE) traffic flows between plural BE service classes having different service priorities and between user traffic within each BE service class; a call admission module configured to accept and initialize user traffic including both BE traffic and non-BE traffic; a user level selection module; an input configured to receive user input—parameters adapted to control at least the user selection module, the call admission module, and the traffic prioritization module; and a memory device configured to at least store the user input—parameters, wherein the user level selection module is configured to selectively use the user input—parameters to: weight traffic flows between the plural BE service classes, reserve a portion of total available bandwidth in the wireless network for BE service flows, establish minimum rate settings for each service class user, responsive to a network congestion condition, dynamically adjust ratios between traffic rates for each BE service class to ensure that users in a highest priority BE service class are maintained at least at an associated minimum reserved traffic rate (MRTR) setting while lower priority service class throughput—is reduced accordingly, and responsive to a determination that the network is uncongested, dynamically adjust ratios between traffic rates for each BE service class to ensure that users in a highest priority BE service class are maintained at least at an associated maximum sustainable traffic rate (MSTR) setting before associated MSTRs of lower priority service classes are satisfied in priority order.

In another embodiment, an apparatus for scheduling prioritized best effort (BE) service flows through a wireless network base station includes a memory device; and a controller coupled to the memory device, wherein, if any one of a plurality of BE service flows are congested, a minimum reserved traffic rate (MRTR) algorithm is used by the controller to ensure that at least a highest priority BE service flow is maintained at least at an associated MRTR, and wherein, if none of the plurality of BE service flows are congested, a maximum sustained traffic rate (MSTR) algorithm is used by the controller to enable the highest priority BE service flow to be set to at least at an associated MSTR before lower priority service flows are increased, wherein, if none of the plurality of BE service flows are congested and each service flow is at their associated MSTR, the controller is configured to distribute any excess bandwidth to each service flow in accordance with an initial set of priority BE traffic flow ratios.

In another embodiment, a computer-readable storage medium comprises computer readable code embodied therein which, when executed by a processor, causes the processor to establish at least first and second best effort (BE) user classes (BE1, BE2), for prioritizing and scheduling associated BE traffic flows in the network, wherein the BE1 user class is assigned a higher priority for traffic throughput—than the BE2 user class; assign a first maximum sustainable traffic rate threshold value (MSTR_1) that establishes an upper bound of bandwidth to be allocated to each user in the BE1 user class and assign a first minimum reserved traffic rate threshold value (MRTR_1) that establishes a lower bound of bandwidth to be allocated to each user in the BE1 user class; assign a second maximum sustainable traffic rate threshold value (MSTR_2) that establishes an upper bound of bandwidth to be allocated to each user in the BE2 user class and assign a second minimum reserved traffic rate threshold value (MRTR_2) that establishes a lower bound of bandwidth to be allocated to each user in the BE2 user class; and establish an initial ratio (BE1:BE2) of throughput—for the BE1 user class to throughput—for the BE2 user class; determine, for each of the BE1 and BE2 user classes, whether associated BE traffic has a traffic throughput—greater than the respective MRTR_1 or MRTR_2 threshold values. If the associated BE traffic has a throughput—greater than the respective MRTR_1 or MRTR_2 threshold value for all associated service class users such that the network BE traffic is in an uncongested state, the processor proportionally allocates any residual bandwidth to the BE1 and BE2 user class traffic in accordance with the initial ratio (BE1:BE2) if all classes of BE user traffic are at least at their associated maximum sustained throughput—rate (MSTR) threshold values, or increases allocated bandwidths for all BE1 users in the BE1 user class to a traffic rate at least equal to the MSTR_1 level before increasing a traffic rate for any lower priority service class user. If the associated BE traffic has a throughput—less than or equal to the respective MRTR_1 or MRTR_2 threshold value for any associated service class user such that the network BE traffic is in a congested state, the processor estimates a traffic throughput—degradation. If the BE1 service class traffic rate is less than the MRTR_1 threshold value for any BE1 service user, the processor increases any deficient BE1 user traffic rate by at least a portion of the estimated throughput—degradation sufficient to provide BE1 user traffic at least at the MRTR_1 level and reduces lower priority service user traffic as necessary. If the BE1 service class traffic rate is at least at the MRTR_1 threshold value for all BE1 service users and if the BE2 service class traffic rate is less than the MRTR_2 threshold value for any BE2 service user, the processor maintains the BE1 service class traffic rates and increase any deficient BE2 user traffic rate by at least a portion of the estimated throughput—degradation sufficient to provide BE2 user traffic at least at the MRTR_2 level and reduce any lower priority service user traffic as necessary.

In another embodiment, a computer-implemented method of scheduling and prioritizing best effort (BE) traffic in a data communications network includes providing a network node comprising a traffic scheduler. The traffic scheduler may be configured to establish Gold (G), Silver (S), and Bronze (B) BE user classes, wherein a relative priority of BE traffic associated with Gold users is greater than a relative priority of BE traffic associated with Silver users, and the relative priority of BE traffic associated with Silver users is greater than a relative priority of BE traffic associated with Bronze users; determine whether a data throughput condition for users in each class at least equals an associated minimum reserved traffic rate threshold value (MRTR_k) for each user class k={G, S, B}; responsive to a determination that at least one user in either the Gold or Silver user classes has a data throughput—shortage condition less than the associated MRTR_G or MRTR_S threshold value, identify all lower priority users having an allocated bandwidth in excess of their associated MRTR_S or MRTR_B threshold value; order the identified lower priority users in each lower priority user class in the order of decreasing excess bandwidth amounts to establish an indexed set of lower priority users, e.g., R={b(0), b(1), ..., s(0), s(1), ... } (meaning taking away excess bandwidth from lower priority class users first, i.e., Bronze users first, then Silver users), each having borrowable bandwidth; and for each determined Gold or Silver user having a data throughput—shortage condition, reallocate the borrowable bandwidth in indexed order from the indexed set until at least all Gold users have data throughput—at least equal to the MRTR_G threshold value.

In another embodiment, a computer-implemented method of scheduling and prioritizing best effort (BE) traffic in a data communications network includes providing a network node comprising a traffic scheduler. The traffic scheduler may be configured to establish Gold (G), Silver (S), and Bronze (B) BE user classes, wherein a relative priority of BE traffic associated with Gold users is greater than a relative priority of BE traffic associated with Silver users, and the relative priority of BE traffic associated with Silver users is greater than a relative priority of BE traffic associated with Bronze users; determine whether a data throughput condition for users in each class at least equals an associated maximum sustained traffic rate (MSTR_k) for each user class k={G, S, B}; responsive to a determination that at least one user in any user class has a data throughput—shortage condition with respect to the associated MSTR_k threshold value, identify all users having an allocated bandwidth in excess of their associated MSTR_k threshold value; order the identified excess bandwidth users by user class and excess bandwidth in the order of user class priority and decreasing excess bandwidth amounts to establish an indexed subset of users each having borrowable bandwidth, e.g., R={b(0), b(1), ..., s(0), ... g(0), ... } (meaning taking away excess bandwidth from lower priority class users first, i.e., Bronze users first, then Silver users, and then possibly even from a Gold user, as necessary); and for each Gold user determined to have a data throughput—shortage condition, reallocate at least a portion of the borrowable bandwidth in indexed order from the indexed set to enable a data throughput—at least equal to the MSTR_G threshold value, if an amount of borrowable bandwidth permits.

BRIEF DISCUSSION OF THE DRAWINGS

FIG. 1 provides an illustration of a conventional wireless network in which the inventive concept disclosed herein may be employed;

Figure 13:
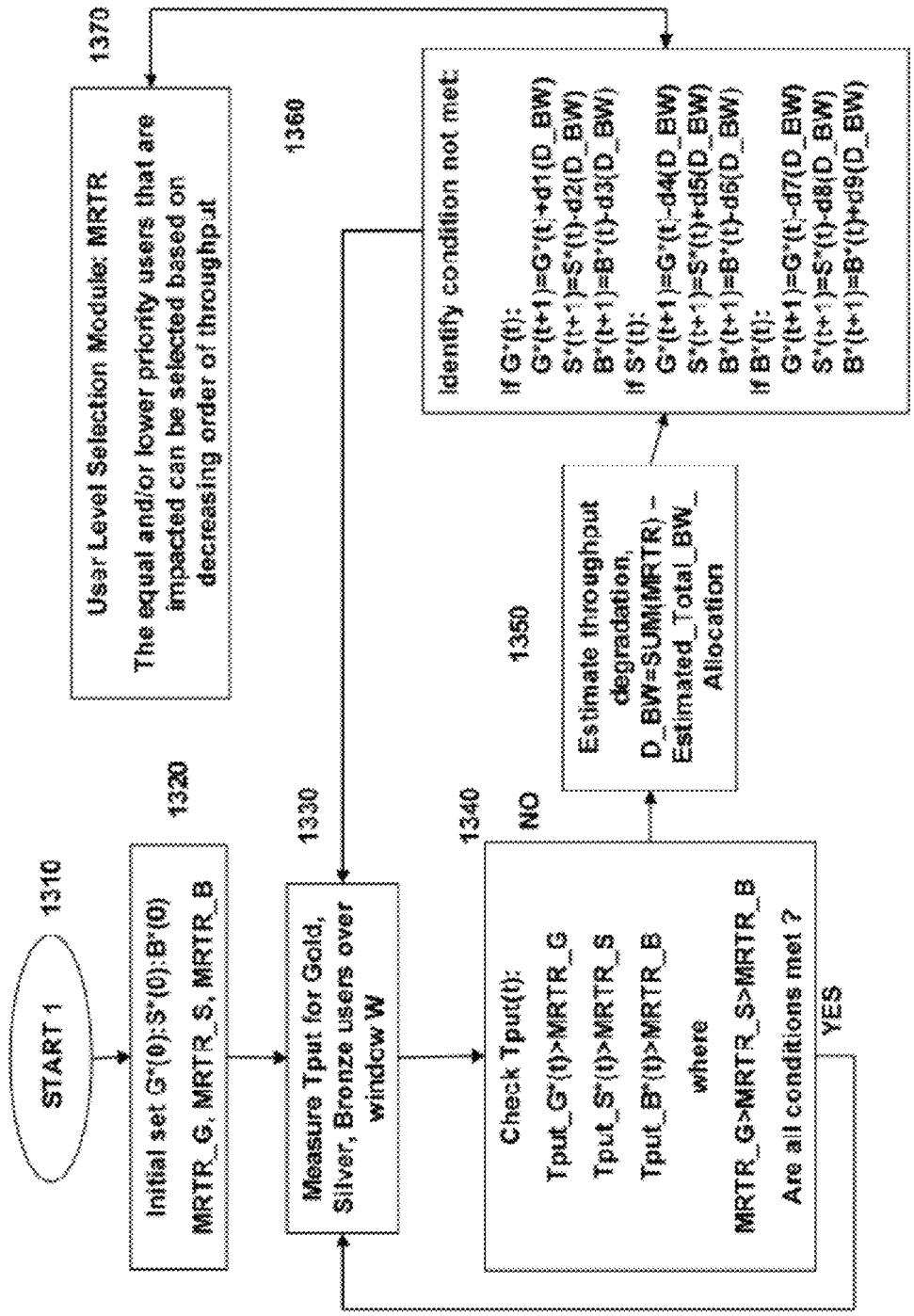
Figure 14:
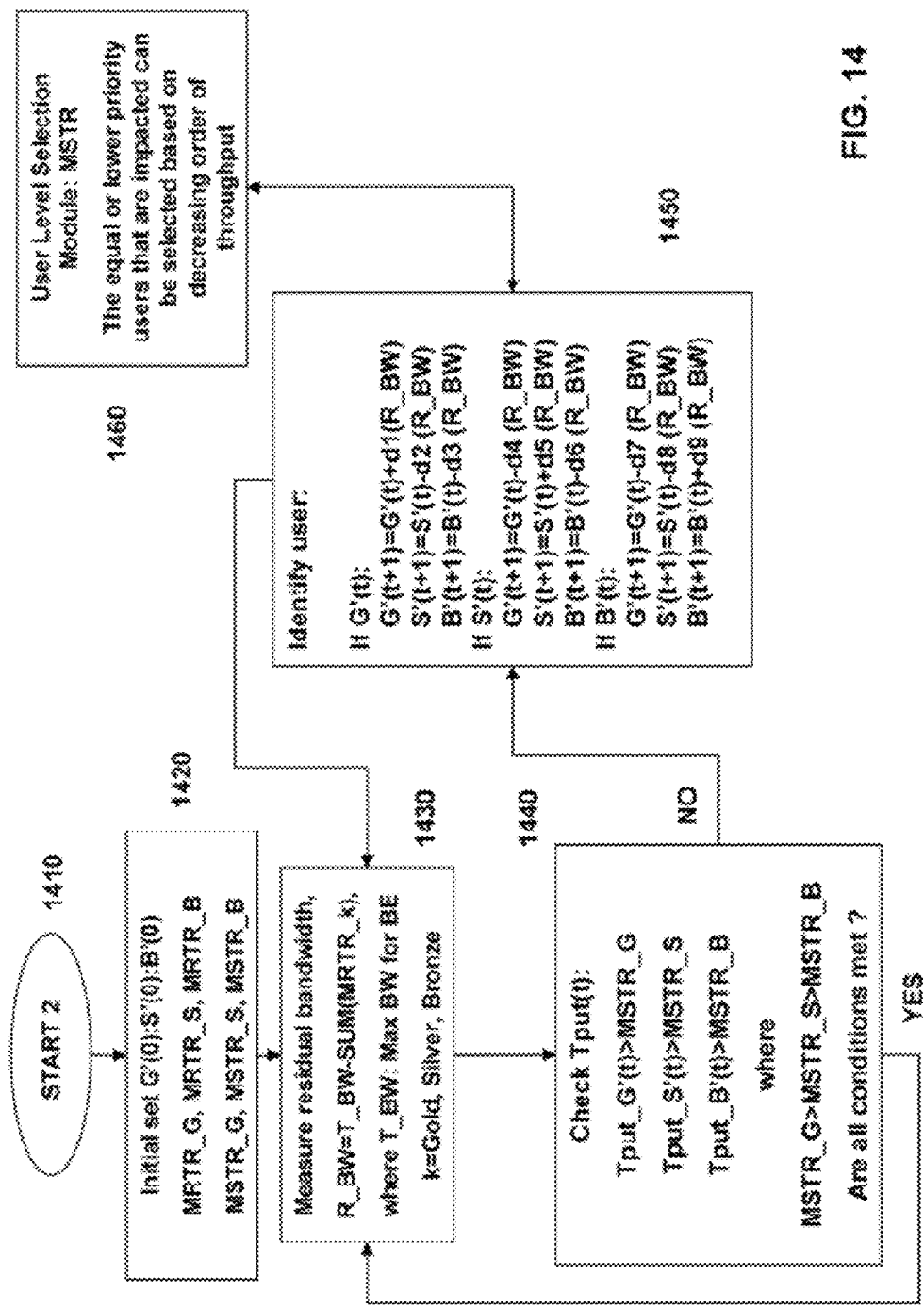
Figure 15:
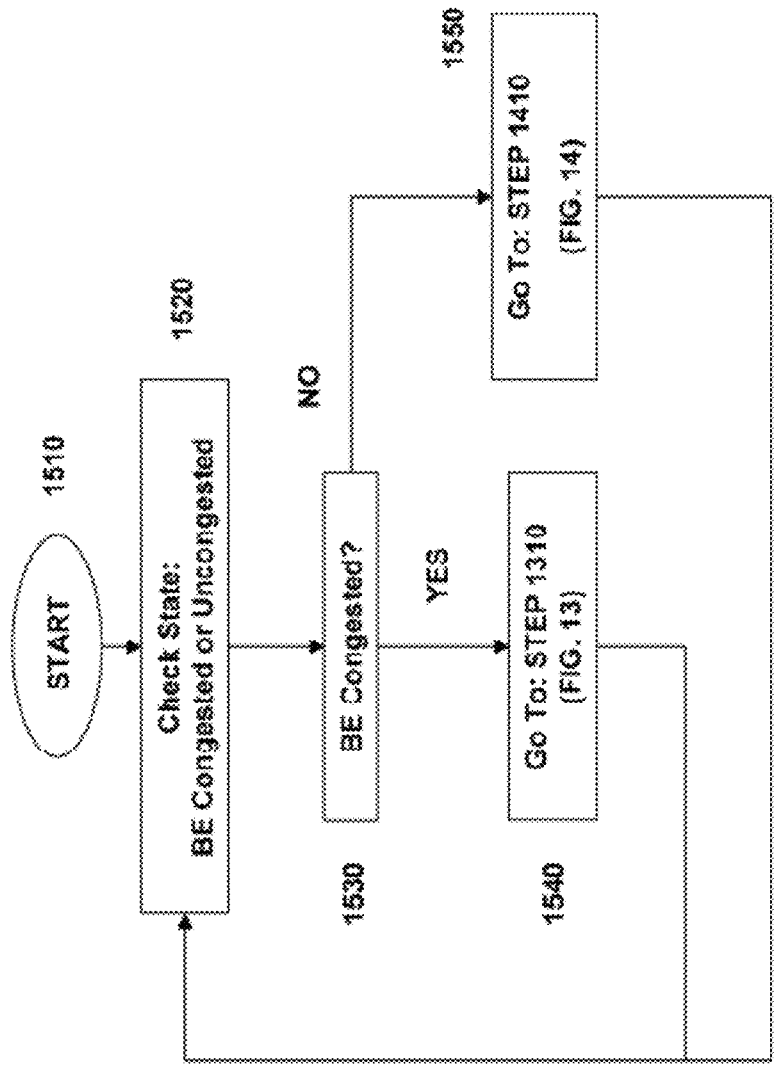
Figure 16:
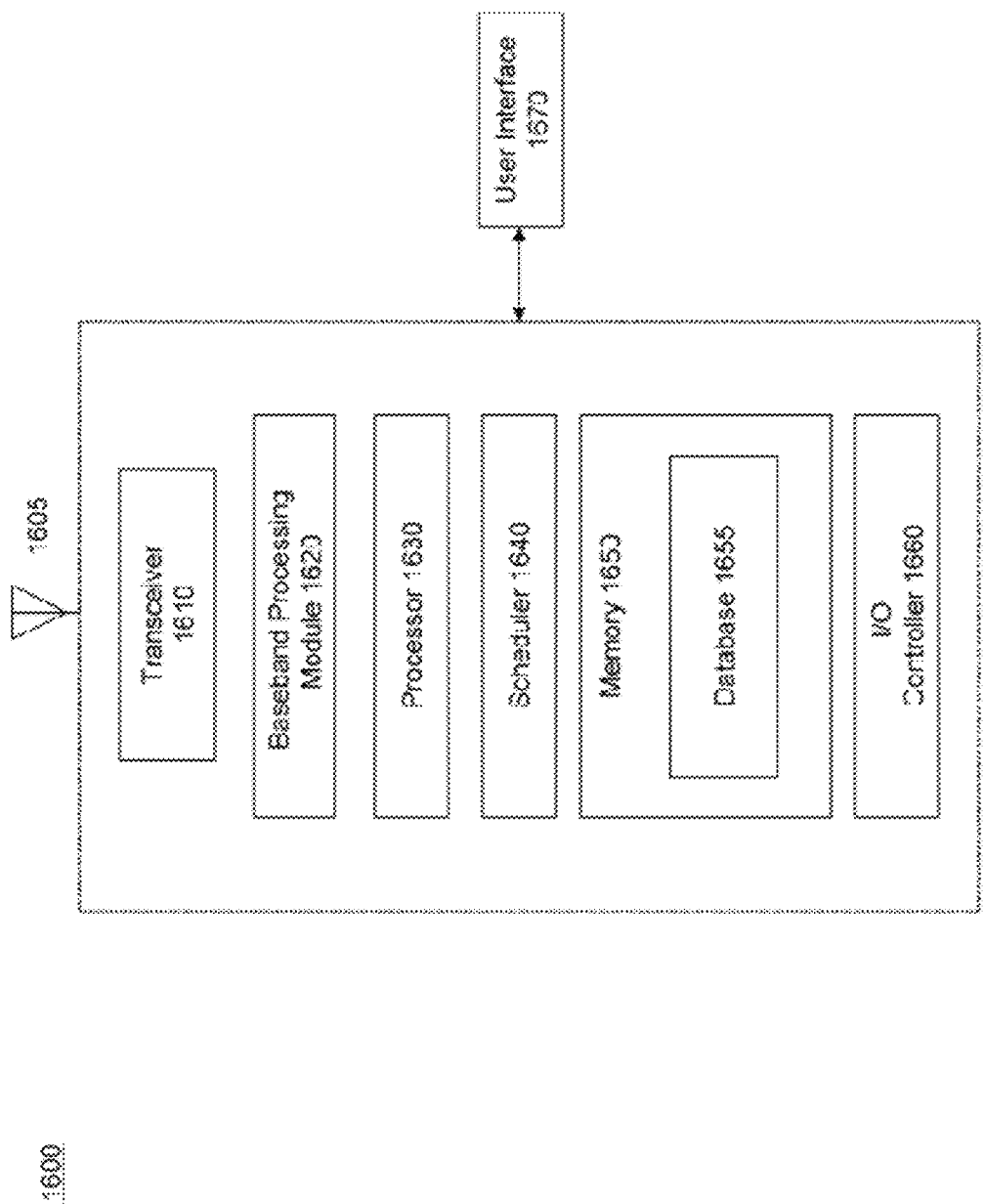
Figure 17:
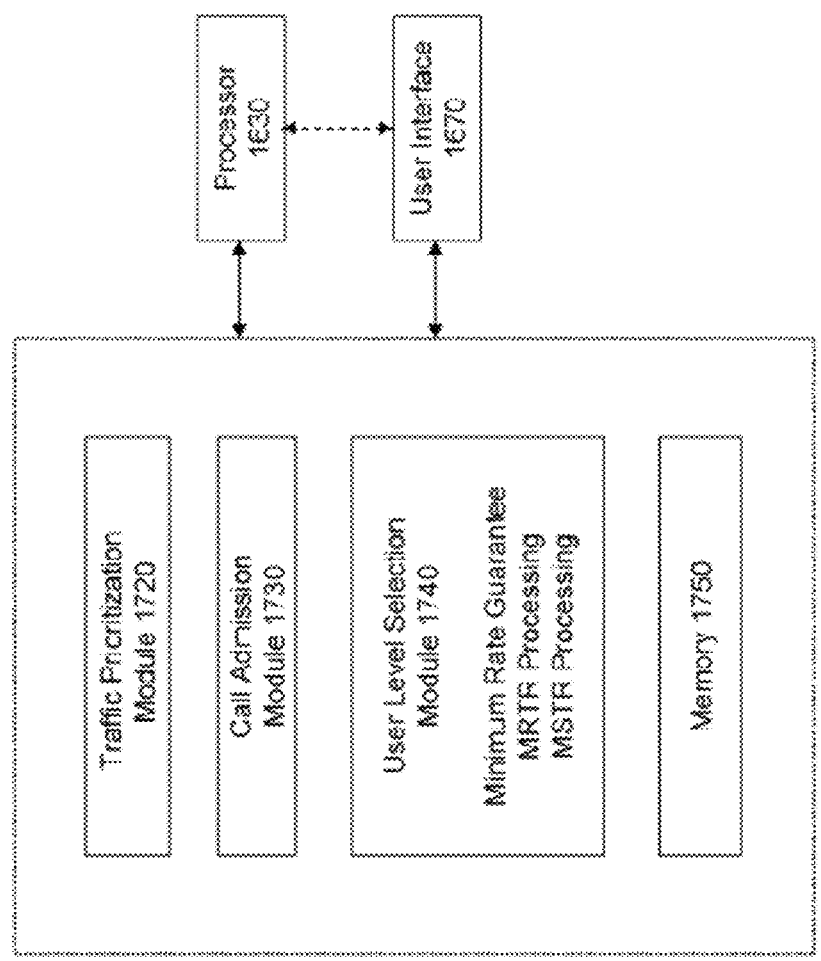

FIG. 13 provides an exemplary flowchart for changing the scheduler ratio to maintain MRTR in a congested BE traffic environment;

FIG. 14 provides an exemplary flowchart for changing the scheduler ratio to maintain MSTR in an uncongested BE traffic environment;

FIG. 15 provides an exemplary consolidated flowchart that links the processes of FIGS. 13 and 14 to provide for the prioritization of BE traffic scheduling in accordance with an embodiment;

FIG. 16 provides an exemplary block diagram of a network BS in accordance with an embodiment of this disclosure; and FIG. 17 provides an exemplary block diagram of a scheduler embodiment of this disclosure.

DETAILED DESCRIPTION

In the discussion of various embodiments and aspects of the system and method of this disclosure, examples of a processor or computer may include any one or more of, for instance, a personal computer, portable computer, personal digital assistant (PDA), workstation, web-enabled mobile phone, WAP device, web-to-voice device, or other device. Those with skill in the art will appreciate that the inventive concept described herein may work with various system configurations.

In addition, various embodiments of this disclosure may be made in hardware, firmware, software, or any suitable combination thereof. Aspects of this disclosure may also be implemented as instructions stored on a machine-readable medium, which may be read and executed by one or more processors, or instructions transmitted over a transmission medium. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others. In addition, a machine-readable transmission medium may include signals propagated over a conductor or over a wireless link. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions.

Figure 1:
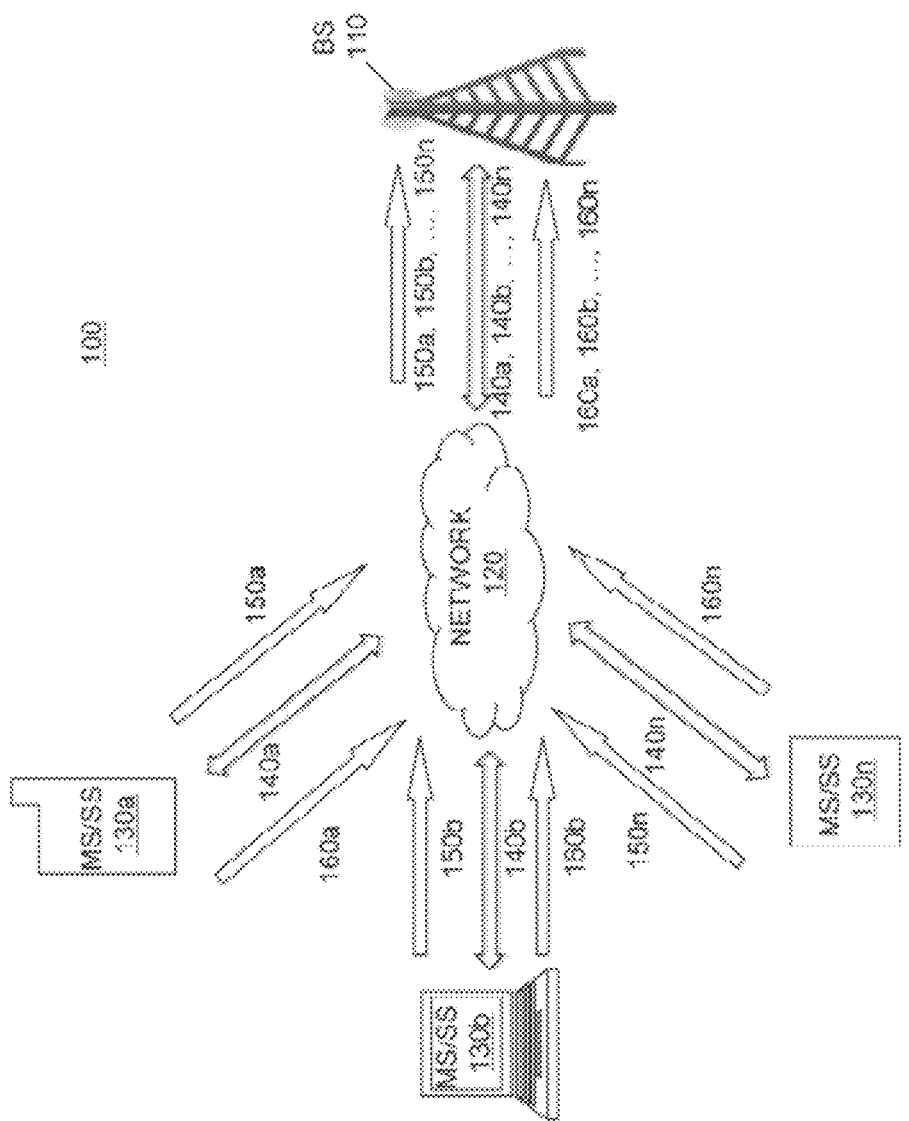
Figure 2:
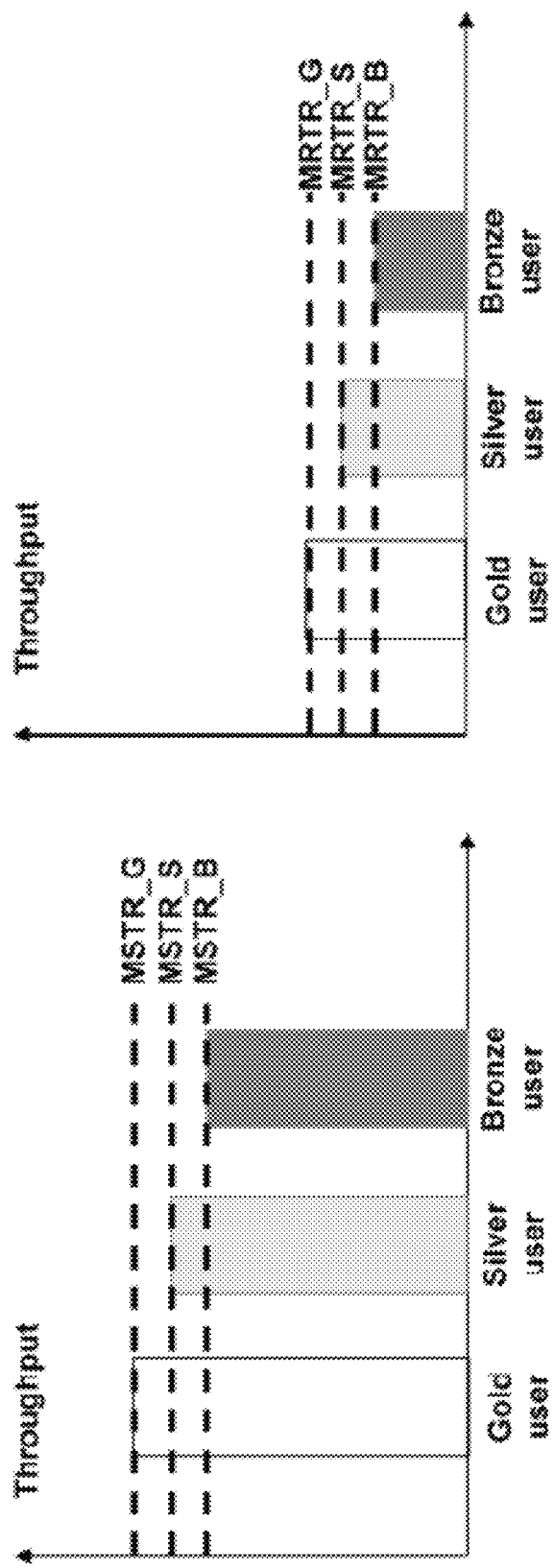
FIGS. 2A and 2B illustrate the conventional concepts of "best effort" (BE) type, Minimum Reserved Traffic Rate (MRTR), and Maximum Sustainable Traffic Rate (MSTR) relative to traffic throughput—(available bandwidth) in a network.
Figure 3:
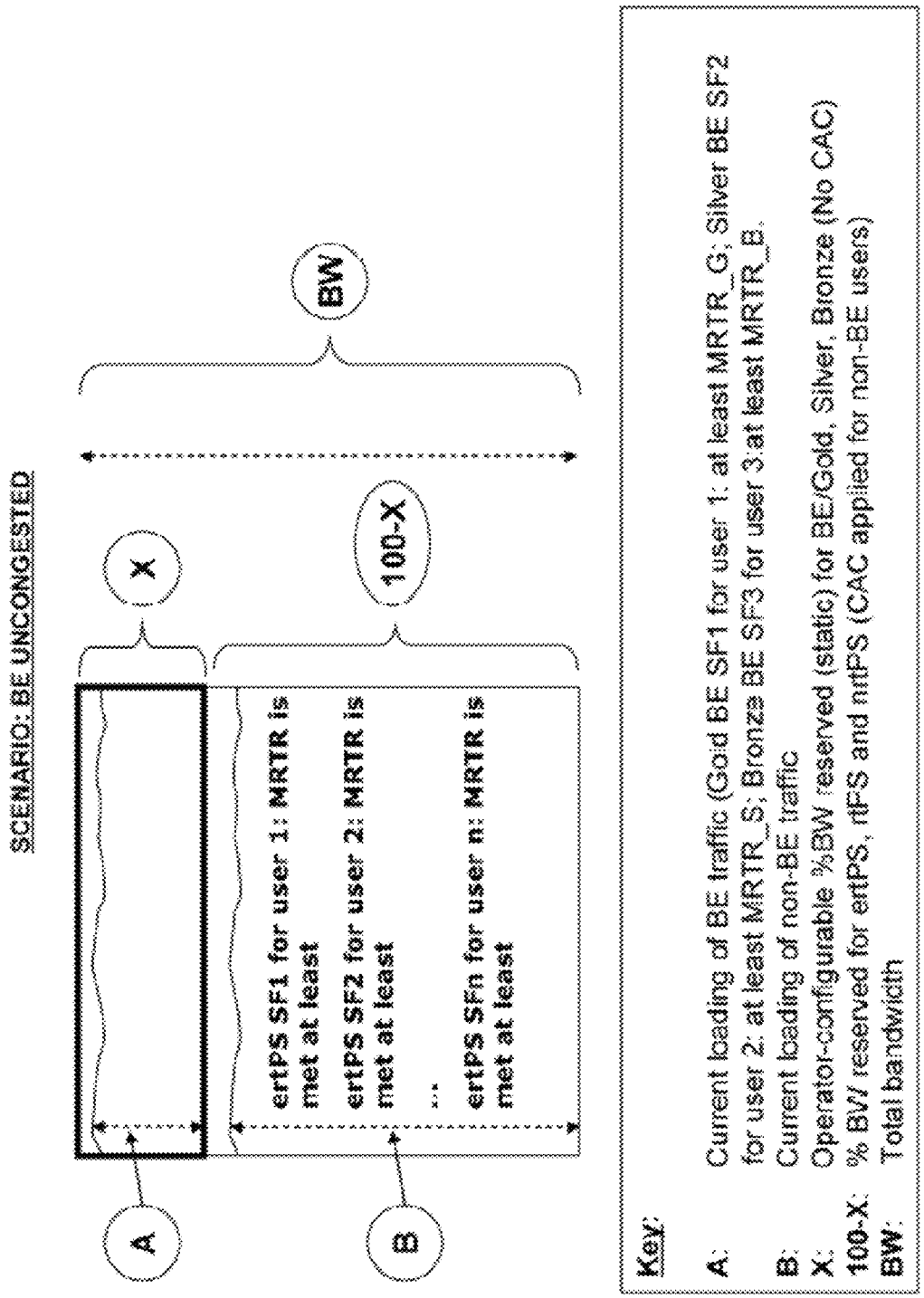
FIG. 3 illustrates conventional bandwidth allocation for BE in a normal mode of operation for various service flows ("SFn") without traffic congestion.
Figure 4:
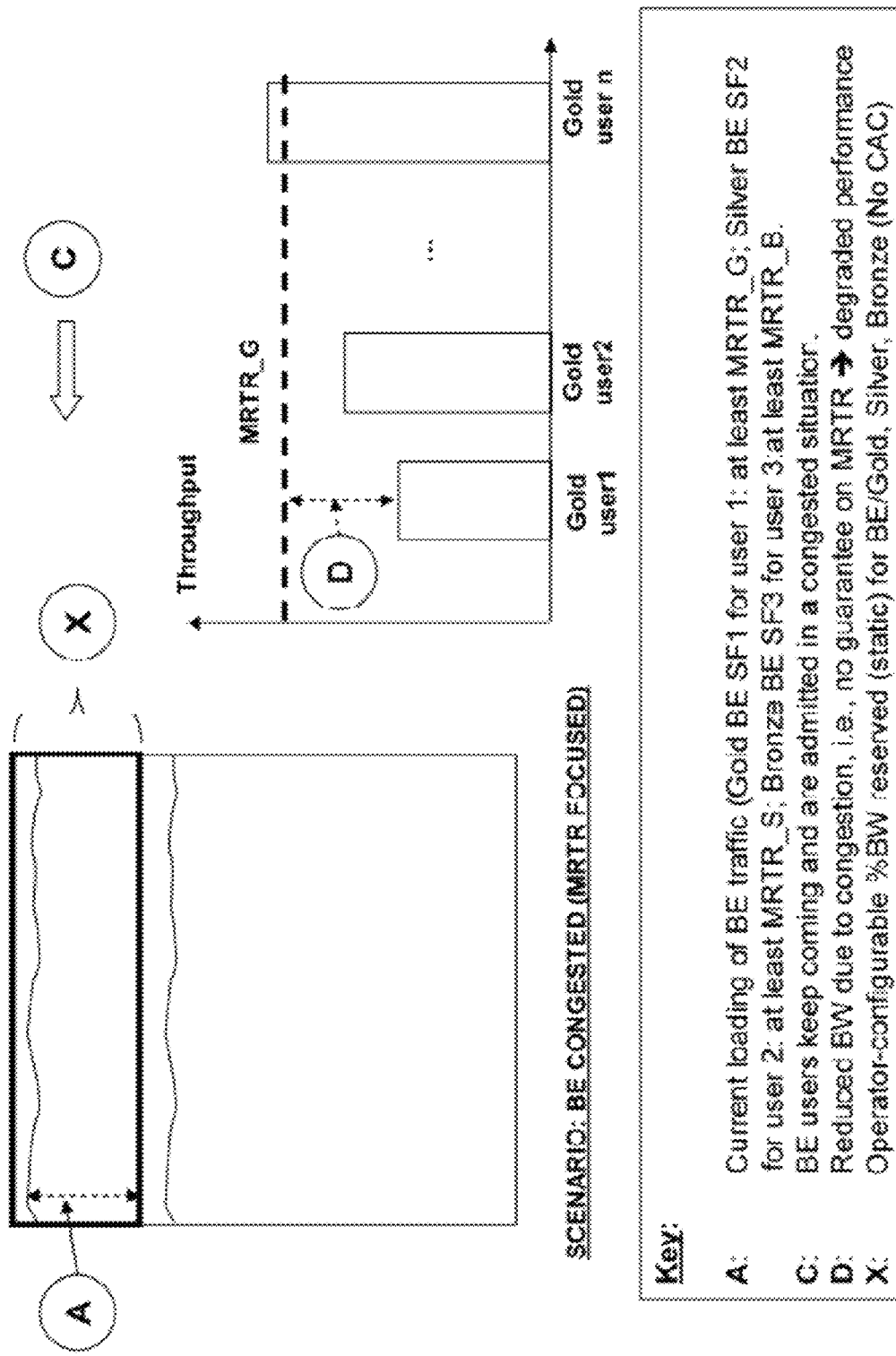
FIG. 4 illustrates problems associated with maintaining MRTR for users encountering a reduction in available bandwidth during a congested traffic condition.

FIG. 1 depicts the architecture of an exemplary WiMAX network implemented in accordance with various aspects of IEEE Standard 802.16e, and in which the inventive traffic scheduling concepts and implementation disclosed herein may be employed, for example, by software modifications in BS 110.

Figure 5:
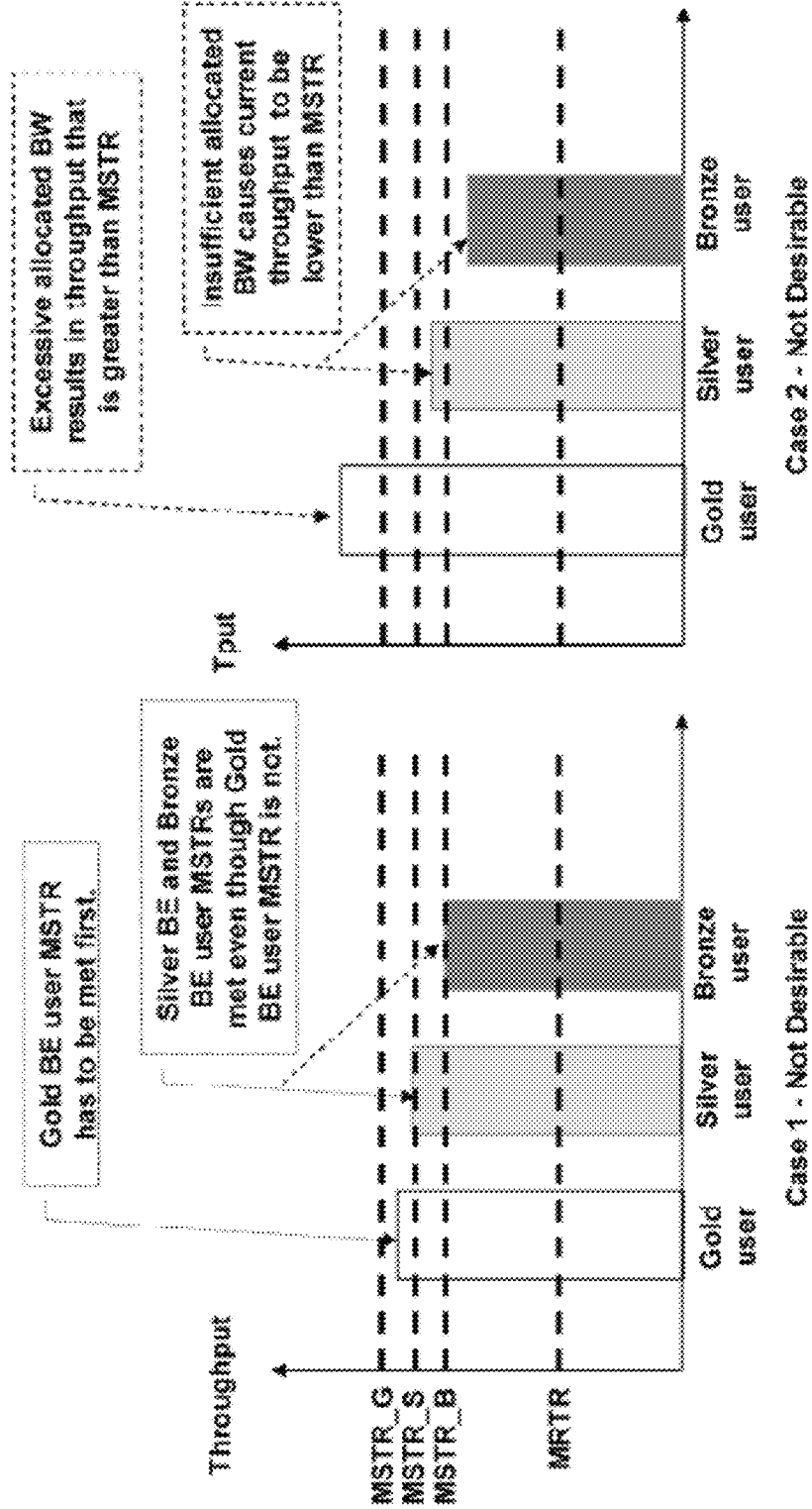
FIG. 5 illustrates conventional problems associated with maintaining MSTR for each user of a particular class of user during an uncongested traffic condition.
Figure 6:
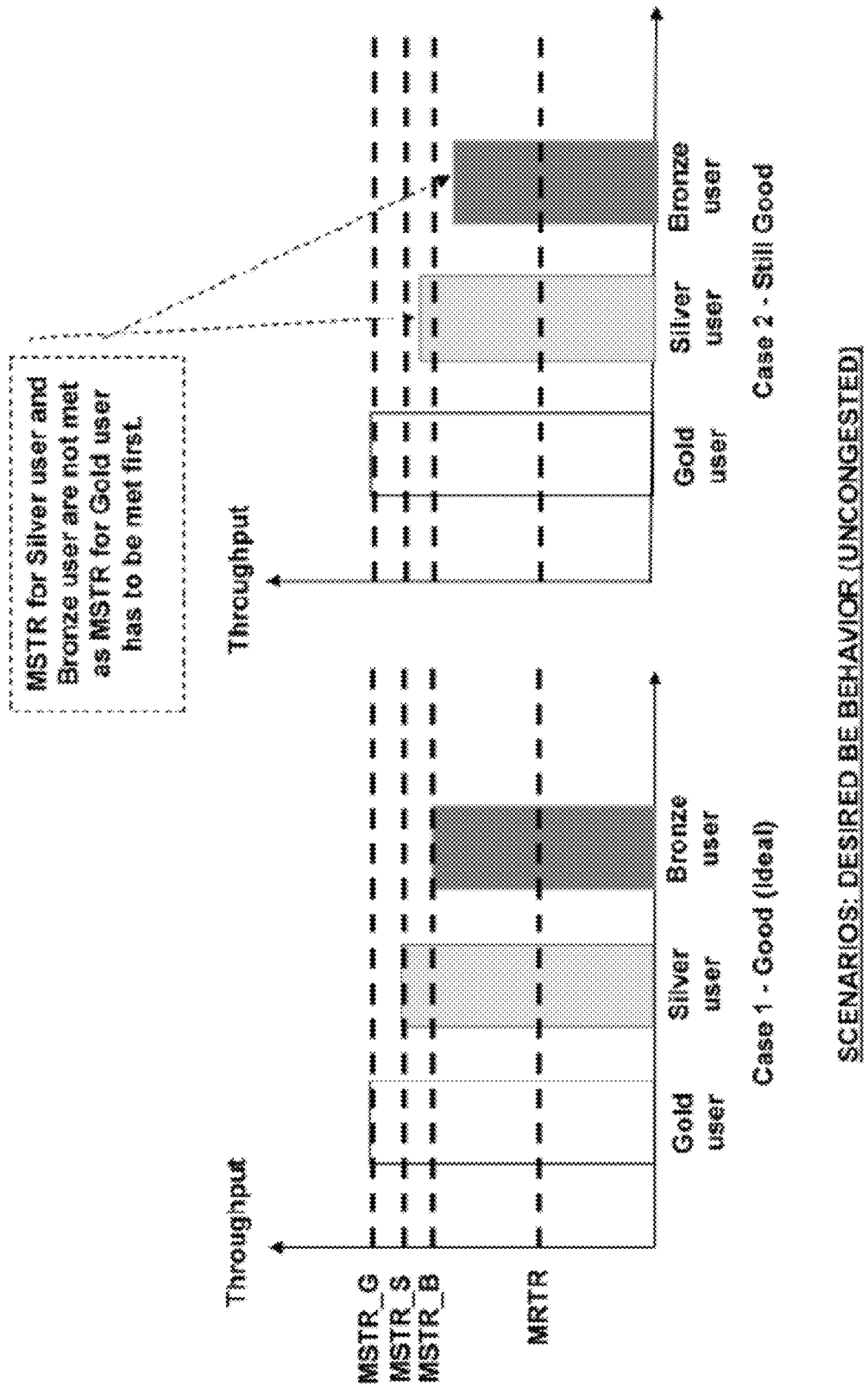
FIG. 6 illustrates two scenarios of desired BE behavior in an uncongested traffic condition in which ideal performance and acceptable performance are depicted in accordance with an embodiment of this disclosure.

Turning to the drawings, FIG. 6 illustrates two scenarios relating to BE traffic throughput—in accordance with one or more embodiments of the inventive concept disclosed herein. Case 1 illustrates an "ideal" traffic throughput—condition in which Gold, Silver, and Bronze BE users are maintained at their respective MSTR throughput—levels in an uncongested traffic condition. Case 2 illustrates a scenario in which Silver and Bronze throughput—levels are reduced below their respective MSTR_S and MSTR_B levels due to network conditions, and an imposed requirement to maintain Gold user throughput—at least at the MSTR_G level. Either case 1 or 2 are preferable to the situations depicted in the cases illustrated in FIG. 5.

Figure 7:
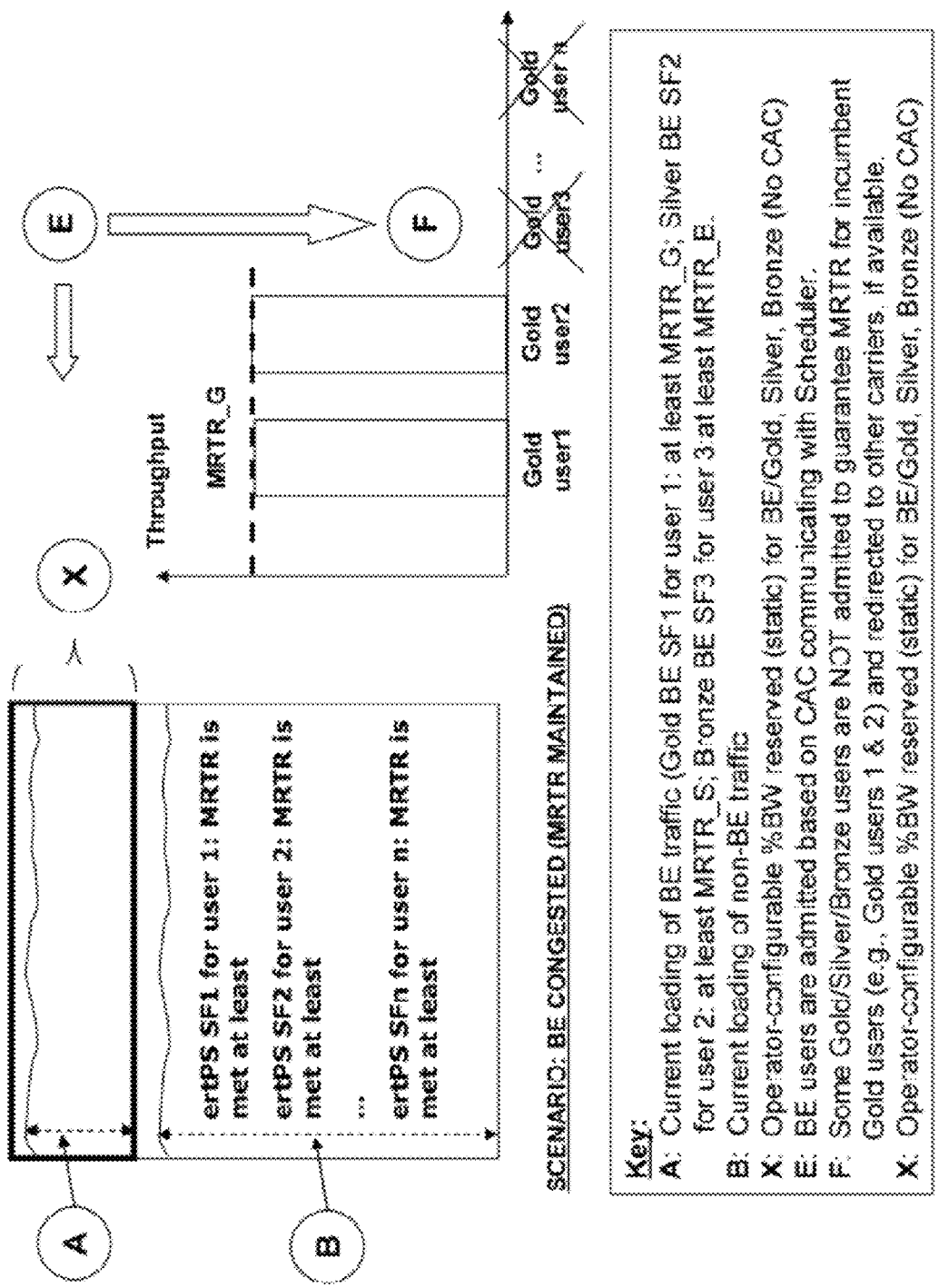
FIG. 7 illustrates allocation of service flows (SF) in an embodiment in which MRTR is maintained for incumbent Gold users in a congested traffic environment.

FIG. 7 illustrates allocation of service flows (SF) in an embodiment in which MRTR is maintained for incumbent Gold users in a congested traffic environment. Reference letter "E" represents BE users being admitted based upon communication with the scheduler. In this congested traffic scenario, maintaining MRTR is the goal. Hence, some Gold/Silver/Bronze users may not be admitted to guarantee MRTR for incumbent higher priority users, i.e., Gold users 1 and 2, as represented by reference "F".

Figure 8:
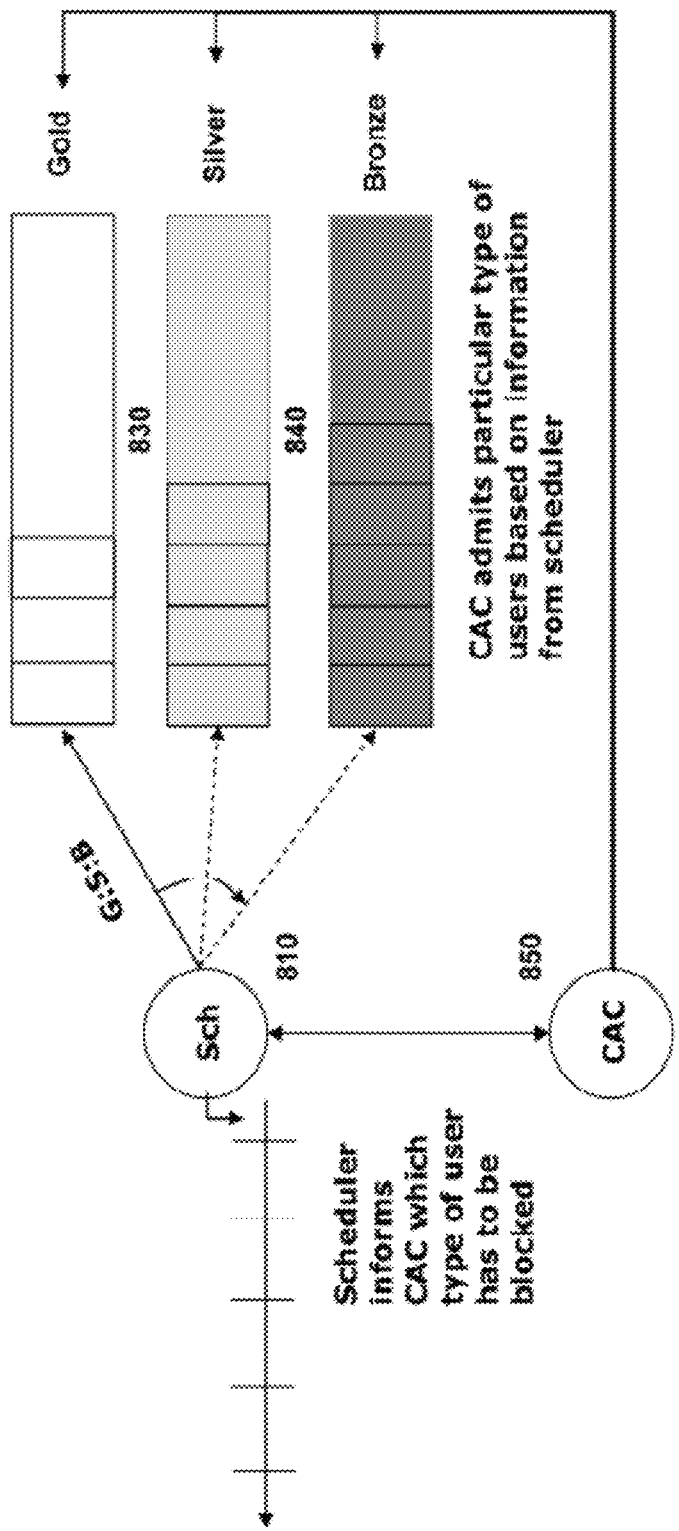
FIG. 8 illustrates an embodiment of a scheduler operation in a congested BE traffic environment.

FIG. 8 illustrates scheduler operation 800 in a congested BE traffic environment. Scheduler 810 measures the throughput—of each type of user during a window "W", and checks to determine if the MRTR is met. The ratio between service flows, i.e., G:S:B, may be dynamically changed based upon the throughput—of each type of user. The service flows 820, 830, and 840 are set by scheduler 810, which informs call admission controller 850 which type of user should be blocked. Particular types of users are admitted by call admission controller 850 based upon information received from scheduler 810.

Figure 9:
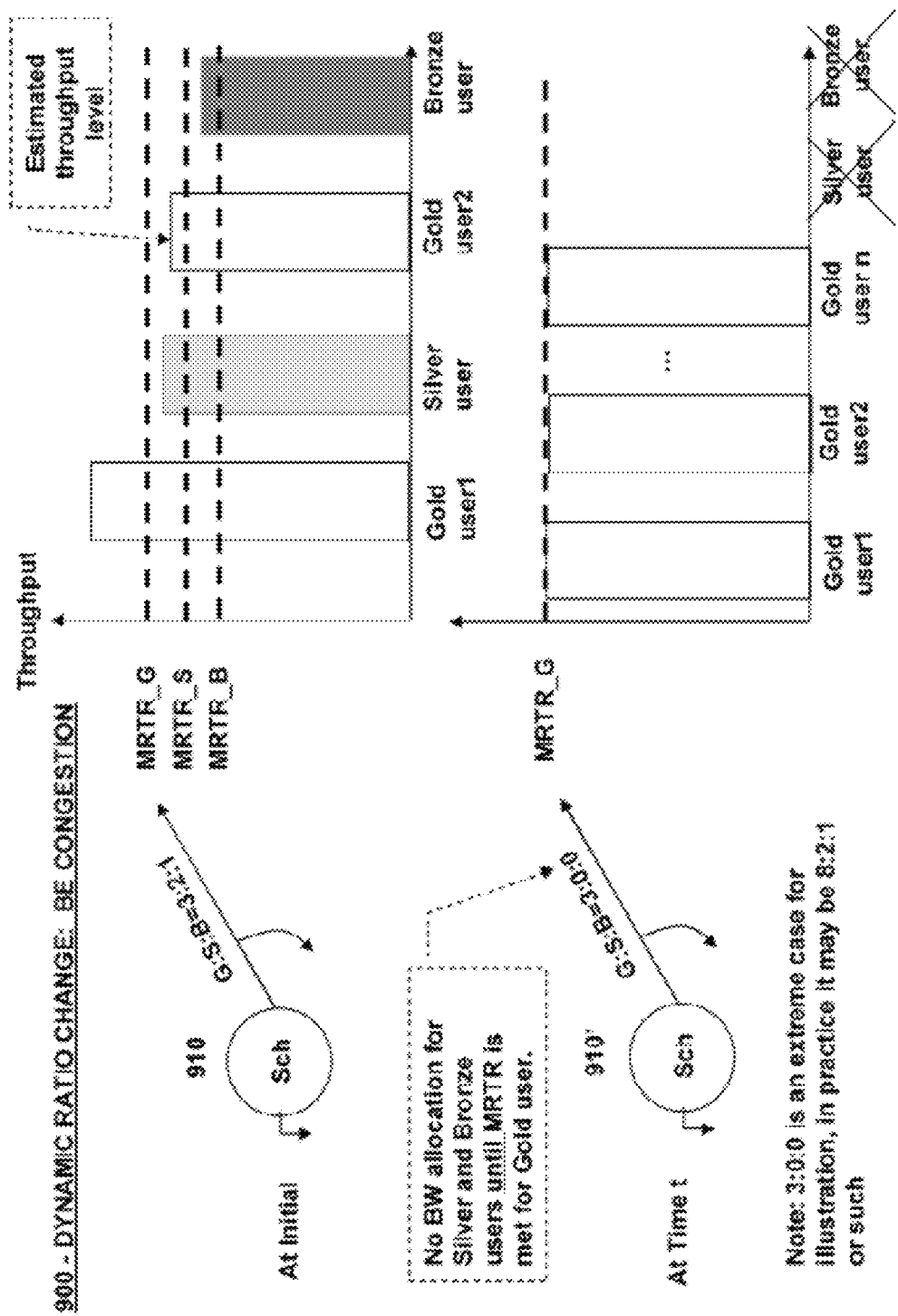
FIG. 9 illustrates an embodiment of a scheduler operation implementing dynamic ratio change among BE user classes in a congested BE traffic environment.

FIG. 9 illustrates dynamic ratio change for scheduler operation 900 in a congested BE traffic environment. Scheduler 910 establishes, for example, an initial ratio G:S:B=3:2:1. In congestion, scheduler 910' may implement a subsequent ratio, e.g., G:S:B=3:0:0, i.e., no bandwidth allocation is made for Silver and Bronze users until the MRTR is met for the Gold user. The ratio may be dynamically changed to any desired ratio that serves to meet system requirements. For example, G:S:B=8:2:1 may be more practical and acceptable than "zero" throughput—for Silver and Bronze users. When MRTR is involved, scheduler 910 operates to ensure that each high priority user, i.e., each Gold user 1, 2, ..., n, has service flow at the MRTR_G level.

Figure 10:
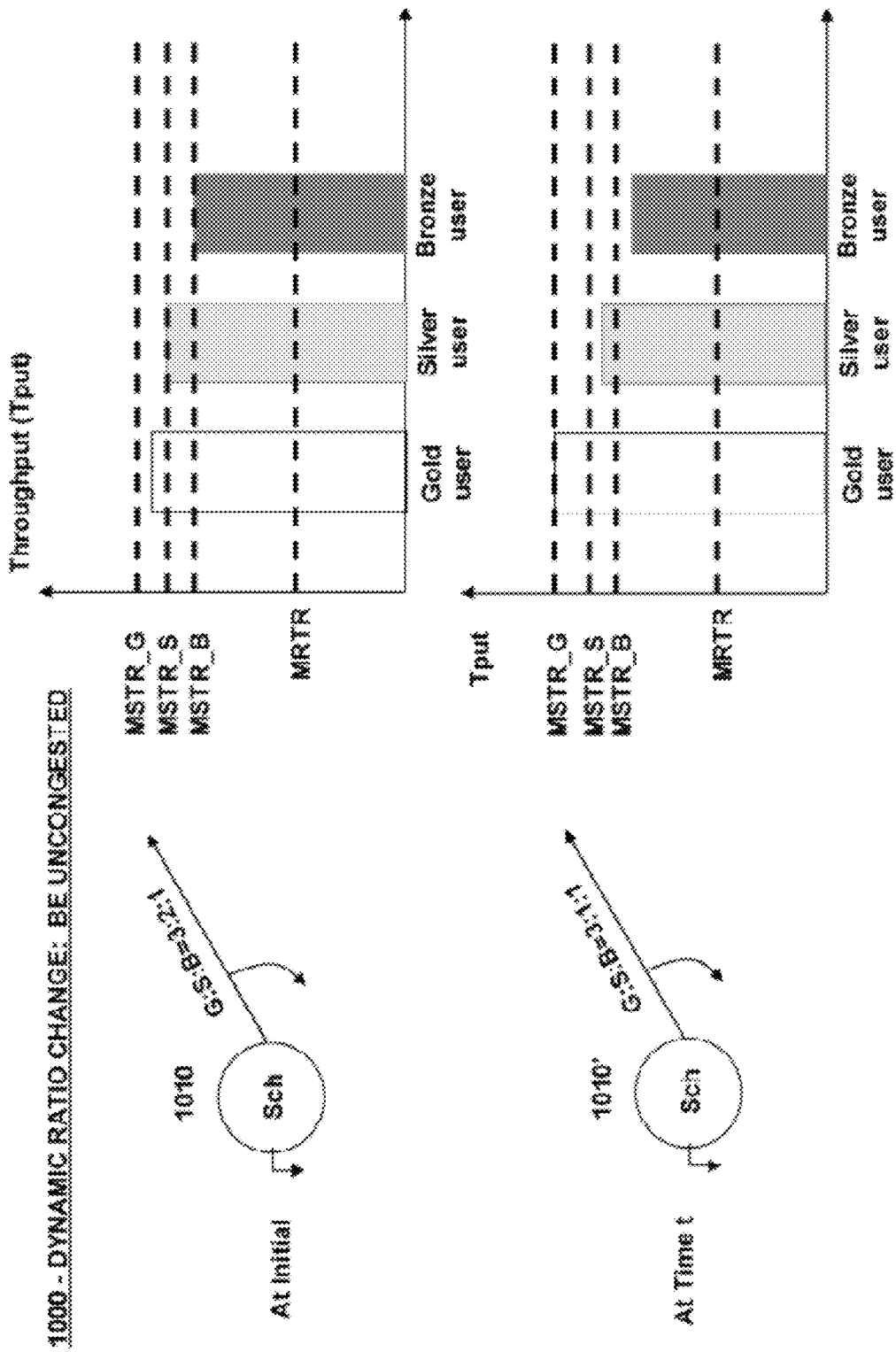
FIG. 10 illustrates an exemplary embodiment of a scheduler dynamic ratio change among BE user classes in an uncongested BE traffic environment.

FIG. 10 illustrates another embodiment of a scheduler dynamic ratio change among BE user classes in an uncongested BE traffic environment. Scheduler 1010 establishes, for example, an initial ratio G:S:B=3:2:1. In a situation where a Gold user does not meet its MSTR while Silver and Bronze users meet their respective MSTR, scheduler 1010' may implement a subsequent ratio, e.g., G:S:B=3:1:1, i.e., reduced bandwidth allocation is made for Silver and Bronze users until the MSTR is met for the Gold user. When MSTR is involved, scheduler 1010 operates to ensure that each service class is at least at their respective MRTR level, and that the highest priority Gold users have service flows at the MSTR_G level, if possible.

Figure 11:
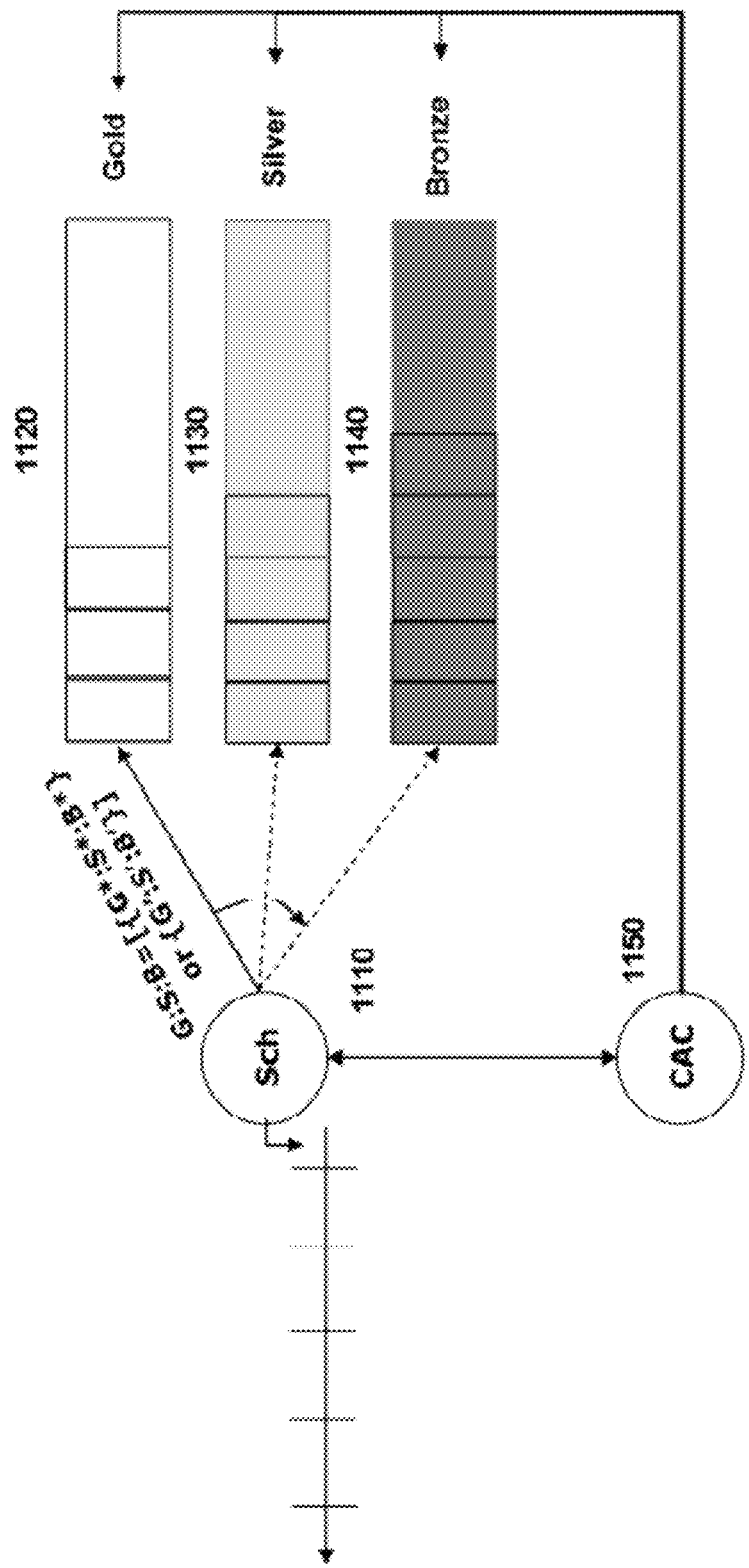
FIG. 11 illustrates an generalized representation of a consolidated scheduler embodiment encompassing scheduler dynamic ratio changes among BE user classes for both congested and uncongested BE traffic environments.

FIG. 11 illustrates an generalized representation of a consolidated scheduler operation 1100 that encompasses scheduler dynamic ratio changes among BE user classes for both congested and uncongested BE traffic environments. Scheduler 1110 is configured to apply different priority ratios for BE congested and BE uncongested states in support of Gold flow 1120, Silver flow 1130, and Bronze flow 1140, admitted by call admission controller 1150.

Figure 12:
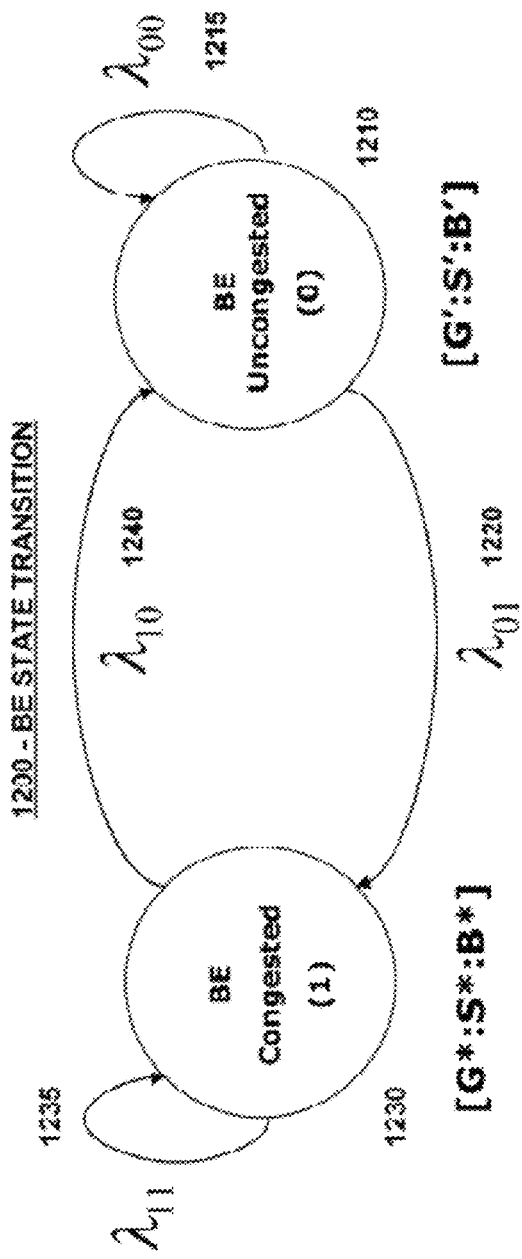
FIG. 12 illustrates exemplary Gold user state transitions for congested and uncongested BE traffic conditions.

FIG. 12 illustrates exemplary Gold user state transitions for congested and uncongested BE traffic conditions. The system remains in BE uncongested state 1210 if throughput—remains greater than MRTR for all Gold BE users, as represented by state loop 1215. The service flow ratios are represented by [G':S':B']. In this state, an MSTR algorithm is used by the scheduler.

If throughput—for any Gold user falls to MRTR, state transition 1220 is made into BE congested state 1230, where the service flow ratios are represented by [G*:S*:B*]. In this state, an MRTR algorithm is used by the scheduler. If throughput—continues to fall at or below the MRTR for any Gold BE user, the system remains in BE congested state 1230, as represented by state loop 1235. If throughput—is greater than MRTR for all Gold users, state transition 1240 is made back into BE uncongested state 1210.

FIG. 13 provides an exemplary flowchart 1300 for changing the scheduler ratio to maintain MRTR in a congested BE traffic environment. Process 1300 commences at step 1310 and proceeds to step 1320 in which parameters G:S:B and MRTR for each service class are initialized. BE throughput—for Gold, Silver, and Bronze users are measured at step 1330. Throughputs for each service class are compared to their respective MRTR levels in step 1340. If all conditions are met in step 1340, then the process loops back to step 1330. If all conditions are not met in step 1340, then throughput—degradation, D_BW, is estimated in step 1350.

Step 1360 operates to dynamically modify the set of service flow ratios. In general, the service flow type, e.g., G, S, or B, that does not meet their MRTR requirement has their ratio factor increased by a fractional portion of the estimated throughput—degradation, and non-affected service flows have their ratio factors decreased by a fractional portion of the estimated throughput—degradation. For example, if a Gold user lacks service flow at the MRTR_G level, $G^*(t+1)=G^*(t)+d1(D\_BW)$; $S^*(t+1)=S^*(t)-d2(D\_BW)$, and $B^*(t+1)=B^*(t)-d3(D\_BW)$, where d1, d2, and d3 are user-selected fractions, where $1>d1=(d2+d3)>0$, $1>d2\geqq 0$ and $1>d3\geqq 0$ such that d1 and d2 are never simultaneously equal to zero. Similar equations are available in step 1360 if a Silver user or a Bronze user does not have service flow at their associated MRTR_S or MRTR_B level. In this situation, the Gold user retains their previous ratio factor, i.e., $G^*(t+1)=G^*(t)$.

FIG. 14 provides an exemplary flowchart 1400 for changing the scheduler ratio to maintain MSTR in an uncongested BE traffic environment. Process 1400 commences at step 1410 and proceeds to step 1420 in which parameters G:S:B, MRTR, and MSTR for each service class are initialized. Residual system bandwidth (R_BW) is measured at step 1430. Throughputs for each service class are compared to their respective MSTR levels in step 1440. If all conditions are met in step 1440, then the process loops back to step 1430. If all conditions are not met in step 1440, then process 1400 proceeds to step 1450.

Step 1450 operates to dynamically modify the set of service flow ratios to utilize the residual bandwidth. In general, the service flow type, e.g., G, S, or B, that does not meet their MSTR requirement has their ratio factor increased by a fractional portion of the residual bandwidth (R_BW), and non-affected service flows have their ratio factors decreased by a fractional portion of the residual bandwidth. For example, if a Gold user lacks service flow at the MSTR_G level, $G'(t+1)=G'(t)+d1(R\_BW)$; $S'(t+1)=S'(t)-d2(R\_BW)$, and $B'(t+1)=B'(t)-d3(R\_BW)$, where d1, d2, and d3 are user-selected fractions, where, $1>d1=(d2+d3)>0$, $1>d2>=0$ and $1>d3>=0$ such that d1 and d2 are never simultaneously=0. Similar equations are available in step 1450 if a Silver user or a Bronze user does not have service flow at their associated MSTR_S or MSTR_B level. In this situation, the Gold user retains their previous ratio factor, i.e., $G'(t+1)=G'(t)$. Step 1460 operates to allow selection of lower priority users for temporary removal from the network to allow higher priority users to operate at their desired levels.

FIG. 15 provides an exemplary consolidated flowchart 1500 that links the processes of FIGS. 13 and 14 to provide for the prioritization of BE traffic scheduling in accordance with an embodiment. Process 1500 starts at step 1510, and proceeds to step 1520 in which BE traffic congestion is checked. A determination of congestion is made at step 1530. If BE congestion exists, then step 1540 passes control to step 1310 of process 1300 in FIG. 13. Process 1300 is described above. Once process 1300 concludes, the process returns to step 1520 and repeats. If BE congestion does not exist, then step 1550 passes control to step 1410 of process 1400 in FIG. 14. Process 1400 is described above. Once process 1400 concludes, the process returns to step 1520 and repeats.

FIG. 16 provides an exemplary block diagram of network BS 1600 in accordance with an embodiment. BS 1600 includes antenna 1605, transceiver 1610, baseband processing module 1620, one or more processors 1630, scheduler 1640, memory 1650 containing database 1655 therein, and input/output—controller 1660. User interface 1670 is operatively coupled to processor 1630.

FIG. 17 provides an exemplary block diagram of scheduler 1640 that may be implemented in either hardware or software, or a combination of hardware and software represented by a processor, memory, and functional blocks implemented by software in one or more processors. Traffic prioritization module 1720 is configured to prioritize best effort (BE) traffic flows between plural BE service classes having different service priorities and between user traffic within each BE service class, e.g., Gold, Silver, and Bronze service classes. Call admission module 1730 is configured to accept and initialize user traffic including both BE traffic and non-BE traffic. User level selection module 1740 may be configured to selectively use the user input—parameters to weight traffic flows between the plural BE service classes, reserve a portion of total available bandwidth in the wireless network for BE service flows, and establish minimum rate settings for each service class user. Further, responsive to a network congestion condition, the ratios between traffic rates for each BE service class may be dynamically adjusted to ensure that users in a highest priority BE service class are maintained at least at an associated minimum reserved traffic rate (MRTR) setting while lower priority service class throughput—is correspondingly reduced.

Still further, responsive to a determination that the network is uncongested, ratios between traffic rates for each BE service class may be dynamically adjusted to ensure that users in a highest priority BE service class are maintained at least at an associated maximum sustainable traffic rate (MSTR) setting before associated MSTRs of lower priority service classes are satisfied in priority order. Scheduler 1640 has an input—configured to receive user input parameters adapted to control at least the user selection module, the call admission module, and the traffic prioritization module, e.g., through user interface 1670. Input—parameters and other system data may be stored in memory 1750.

The Appendix to this disclosure provides exemplary algorithms for implementation in user selection module 1740, e.g., an algorithm to maintain BE service flows at least at the MRTR level, and an algorithm for maintaining BE service flows for higher priority service flows at the MSTR level. These algorithms are self-documenting, and are believed to be understandable by a person of ordinary skill in the art. The exemplary algorithms in the Appendix to this disclosure are presented with the understanding that the disclosed algorithms are presented by way of example only, and are not intended to limit the scope of the appended claims.

Various embodiments herein are described as including a particular feature, structure, or characteristic, but every aspect or embodiment may not necessarily include the particular feature, structure, or characteristic. Further, when a particular feature, structure, or characteristic is described in connection with an embodiment, it will be understood that such feature, structure, or characteristic may be included in connection with other embodiments, whether or not explicitly described. Thus, various changes and modifications may be made to this disclosure without departing from the scope or spirit of the inventive concept described herein. As such, the specification and drawings should be regarded as examples only, and the scope of the inventive concept to be determined solely by the appended claims.

Appendix

Algorithm for User Level Selection Module-MRTR: This module does not take away from equal priority users. However, that may be implemented as an option as described in the User Level Selection Module: MSTR.

$G=\{u_{g1}, u_{g2}, \ldots, u_{gn_g}\}$: Gold BE user set
$S=\{u_{s1}, u_{s2}, \ldots, u_{sn_s}\}$: Silver BE user set
$B=\{u_{b1}, u_{b2}, \ldots, u_{bn_b}\}$: Bronze BE user set
MRTR_k: MRTR for k BE user, k ∈ {G,S,B}
if condition (1) is not met for all users, $$T_{put\_k} \geq \text{MRTR\_k} \; \forall k \in \{G,S,B\} \quad (1),$$

where $T_{put\_k}$ represents throughput for users.
Case 1: Condition (1) is not met for any Gold BE user, i.e.,
 $T_{put\_k}$<MRTR_k, k ∈G⊂G
Identify Bronze or Silver BE users such that $T_{put\_k}$ ≧MRTR_k, k∈{S-S, B-B}
Calculate $R_{put\_k} = T_{put\_k} - \overline{\text{MRTR}}$ k, k ∈{S-S, B-B}, which is excess/borrowable bandwidth (or data rate).
Make an ordering for Bronze BE user and Silver BE users such that
$R_{put\_b(0)} \geq R_{put\_b(1)} \geq, \ldots, \geq R_{put\_b(j)}, \ldots, \geq R_{put\_b(n_b)}$, b ∈B-B
$R_{put\_s(0)} \geq R_{put\_s(1)} \geq, \ldots, R_{put\_s(j)}, \ldots, \geq R_{put\_s(n_s)}$, s ∈S-S
R_B={b(0), b(1), ..., b(j), ..., b(n_b), b ∈B-B}
R_S={s(0), s(1), ..., s(j), ..., s(n_s), s ∈S-S}
Ordering Index:
R=R_B+R_S={b(0), b(1), ..., b(n_b), s(0), s(1), ..., s(n_s)}
for j ∈R,
 check if Condition (2) is met $$\sum_{l=0}^{j} R_{put\_k(l)} \geq \text{MRTR\_k} - T_{put\_k}, k \in G \quad (2)$$

if Condition (2) is met, exit "for loop"
otherwise, j=j+1, and continue "for loop" end:

$$X_k = \sum_{l=0}^{j^*} R_{put\_k(l)}$$

where j* is the last j when "for loop" is completed, and "Xk" is the total excess bandwidth taken away from lower priority users.
$G_k = G_k + d1(X_k)$, ∀k ∈G
$S_k = S_k - d2(X_k)$, ∀k ∈R_S(j*)
$B_k = B_k - d3(X_k)$, ∀k ∈R_B(j*)
where
Ordering Index:
R_B(j*)=R_B and R_S(j*)=the first (j*-n_b) users in R_S if j*>n_b,
otherwise R_B(j*)=the first j* users in R_B and R_S(j*)=∅.
Case 2: Condition (1) is not met for any Silver BE user, i.e.,
 $T_{put\_k}$<MRTR_k, k ∈S⊂S
A similar scheme may be applied., i.e., take BW away from lower priority users with excess BW.
Case 3: Condition (1) is not met for any Bronze BE user, i.e.,
 $T_{put\_k}$<MRTR_k, k ∈B⊂B
A variation may be applied where available BW resources are balanced across all Bronze BE users.

Algorithm for User Level Selection Module-MSTR:
$G=\{u_{g1}, u_{g2}, \ldots, u_{gn_g}\}$: Gold BE user set
$S=\{u_{s1}, u_{s2}, \ldots, u_{sn_s}\}$: Silver BE user set
$B=\{u_{b1}, u_{b2}, \ldots, u_{bn_b}\}$: Bronze BE user set
MSTR_k :MSTR for k BE user, k ∈{G, S, B}
if Condition (1) is not met for all users in all service classes, the following procedure is applied.

$$T_{put\_k} > \text{MSTR\_k} \; \forall k \in \{G,S,B\} \quad (1)$$

Case 1: Condition (1) is not met for one or more Gold BE users, i.e., $T_{put\_k}$<MSTR—k, k ∈G⊂G
Identify Gold, Silver, or Bronze BE users such that $T_{put\_k}$<MSTR—k, k ∈ {G-G, S-S, B-B}
Calculate $R_{put\_k} = T_{put\_k} - \overline{\text{MSTR\_k}}$, k ∈ {G-G, S-S, B-B}, which is a borrowable bandwidth
Make an ordering for Bronze BE user, Silver BE, and Gold BE users such that
$R_{put\_b(0)} \geq R_{put\_b(1)} \geq, \ldots, R_{put\_b(j)}, \ldots, \geq R_{put\_b(n_b)}$, b ∈B-B
$R_{put\_s(0)} \geq R_{put\_s(1)} \geq, \ldots, R_{put\_s(j)}, \ldots, \geq R_{put\_s(n_s)}$ ∈S-S
$R_{put\_g0)} \geq R_{put\_g(1)} \geq, \ldots, R_{put\_g(j)}, \ldots, R_{put\_g(n_g)})$, g ∈G-G
R_B={b(0), b(1), ..., b(j), ..., b(nb)}, b ∈B-B
R_S={s(0), s(1), ..., s(j), ..., s(n_s), s ∈S-S}
R_G={g(0), g(1), ..., g(j), ..., g(n_g), g ∈_{G-G}}
Ordering Index:
R=R_B+R_S+R_G={b(0), b(1), ..., b(n_b), s(0), s(1), ..., s(n_s), g(0), g(1), ..., g(n_g)}
for j∈R,
 check if Condition (2) is met $$\sum_{l=0}^{j} R_{put\_k(l)} \geq \text{MSTR\_k} - T_{put\_k}, k \in G \quad (2)$$

if Condition (2) is met, exit "for loop"
otherwise, j=j +1 and continue "for loop" end:

$$X_k = \sum_{l=0}^{j^*} R_{put\_k(l)}$$

where j* is the last j when "for loop" is completed (Xk=total excess BW from lower priority and equal priority users).
$G_k = G_k + d11(X_k)$, ∀k ∈G
$G_k = G_k - d12(X_k)$, ∀k ∈R_G(j*)
$S_k = S_k - d2(X_k)$, ∀k ∈R_S(j*)
$B_k = B_k - d3(X_k)$, ∀k ∈R_B(j*)
where
Ordering Index:
R_B(j*)=R_B, R_S(j*)=R_S, and R_G(j*)=the first (j*-n_b -n_s) users in R_G, if j* >n_b +n_s,
R_B(j*)=R_B, R_S(j*)=the first (j*-n_b) users in R_S, and R_G(j*)=∅, if n_b +n_s j* >n_b,
otherwise R_B(j*)=the first j* users in R_B, and R_S(j*)= R_G(j*)=∅.
Case 2: Condition (1) is not met for any Silver BE user, i.e.,
 $T_{put\_k}$<MSTR_k, k ∈S⊂S
A similar scheme may be applied for Silver users, i.e., take away from a Bronze user first, then a Silver user, and even possibly a Gold user whose data throughput is >MSTR_G.
Case 3: Condition (1) is not met for any Bronze BE user, i.e.,
 $T_{put\_k}$<MSTR_k, k ∈B⊂B
A similar scheme may be applied, i.e., take away from a Bronze or Silver user with excess bandwidth, and even possibly a Gold user whose data throughput is >MSTR_G.

What is claimed is:

1. A method of scheduling and prioritizing traffic in a data communications network, the method comprising:
   providing a base station operably coupled to a traffic scheduler,
   wherein the traffic scheduler is configured to:
      establish at least first and second best effort (BE) user classes (BE1, BE2), for prioritizing and scheduling associated BE traffic flows in the network, wherein the BE1 user class is assigned a higher priority for traffic throughput than the BE2 user class;
      assign a first maximum sustainable traffic rate threshold value (MSTR_1) that establishes an upper bound of bandwidth to be allocated to each user in the BE1 user class and assign a first minimum reserved traffic rate threshold value (MRTR_1) that establishes a lower bound of bandwidth to be allocated to each user in the BE1 user class;
      assign a second maximum sustainable traffic rate threshold value (MSTR_2) that establishes an upper bound of bandwidth to be allocated to each user in the BE2 user class and assign a second minimum reserved traffic rate threshold value (MRTR_2) that establishes a lower bound of bandwidth to be allocated to each user in the BE2 user class; and
      establish an initial ratio (BE1:BE2) of throughput for the BE1 user class to throughput for the BE2 user class;
   the method further comprising:
   determining, for each of the BE1 and BE2 user classes, whether associated BE traffic has a traffic throughput greater than the respective MRTR_1 or MRTR_2 threshold values;
   (a) if the associated BE traffic has a throughput greater than the respective MRTR_1 or MRTR_2 threshold value for all associated service class users such that the network BE traffic is in an uncongested state, the traffic scheduler is configured to:
      (1) proportionally allocate any residual bandwidth to the BE1 and BE2 user class traffic in accordance with the initial ratio (BE1:BE2) if all classes of BE user traffic are at least at their associated maximum sustained throughput rate (MSTR) threshold values, or
      (2) increase allocated bandwidths for all BE1 users in the BE1 user class to a traffic rate at least equal to the MSTR_1 level before increasing a traffic rate for any lower priority service class user;
   (b) if the associated BE traffic has a throughput less than or equal to the respective MRTR_1 or MRTR_2 threshold value for any associated service class user such that the network BE traffic is in a congested state, the traffic scheduler is configured to:
      (1) estimate a traffic throughput degradation;
      (2) if the BE1 service class traffic rate is less than the MRTR_1 threshold value for any BE1 service user, increase any deficient BE1 user traffic rate by at least a portion of the estimated throughput degradation sufficient to provide BE1 user traffic at least at the MRTR_1 level and reduce lower priority service user traffic as necessary,
      (3) if the BE1 service class traffic rate is at least at the MRTR_1 threshold value for all BE1 service users and if the BE2 service class traffic rate is less than the MRTR_2 threshold value for any BE2 service user, maintain the BE1 service class traffic rates and increase any deficient BE2 user traffic rate by at least a portion of the estimated throughput degradation sufficient to provide BE2 user traffic at least at the MRTR_2 level and reduce any lower priority service user traffic as necessary.

2. The method of claim 1, wherein the traffic scheduler is further configured to:
   establish a third best effort (BE) user class (BE3) having a lower priority for traffic throughput than both the BE1 and BE2 user classes;
   assign a third maximum sustainable traffic rate threshold value (MSTR_3) that establishes an upper bound of bandwidth to be allocated to each user in the BE3 user class and assign a third minimum reserved traffic rate threshold value (MRTR_3) that establishes a lower bound of bandwidth to be allocated to each user in the BE3 user class; and
   wherein the initial ratio comprises a ratio of throughput for the BE1 user class to throughput for the BE2 user class to throughput for the BE3 user class (BE1:BE2:BE3).

3. The method of claim 2, wherein the BE1, BE2, and BE3 user classes comprise a Gold, Silver, and Bronze user service class, respectively.

4. The method of claim 2, further comprising changing the initial ratio to a dynamic set of ratios that allows a higher priority service class to increase associated user service class traffic to at least a minimum reserved traffic rate threshold value for at least a portion of the higher priority service class users.

5. The method of claim 4, wherein the associated user service class traffic is increased to at least the minimum reserved traffic rate threshold value for all of the higher priority service class users.

6. The method of claim 1, further comprising receiving user input through a user interface to the traffic scheduler, wherein the user input is used by the traffic scheduler to set one or more of the MSTR_1, MSTR_2, MRTR_1, MRTR_2, a percentage of system capacity set aside for BE flows, a window timer period during which traffic rates are analyzed, and the initial ratio.

7. The method of claim 1, further comprising receiving user input through a user interface to the traffic scheduler, wherein the user input is used by the traffic scheduler to set one or more flags effective to enable a call admission module coupled to the scheduler to block new user traffic in one or more of the BE service classes.

8. The method of claim 1, further comprising providing an operator with the ability via a user interface with the traffic scheduler to define a set of ratios that allows traffic rates for all users to be reduced during traffic congestion, and to allow recovery by increasing the traffic rates for all users by the set of ratios.

9. The method of claim 1, further comprising providing an operator with the ability via a user interface with the traffic scheduler to reduce traffic rates for lower priority users and to support higher priority users at their respective minimum reserved traffic rate threshold values, and to allow recovery by first increasing associated traffic rates for all higher priority users.

10. The method of claim 1, further comprising providing an operator with the ability via a user interface with the traffic scheduler to adjust an amount of bandwidth reserved for BE traffic.

11. The method of claim 1, wherein the traffic scheduler is configured to apply call admission control procedures for non-BE traffic allocated outside of bandwidth reserved for BE traffic.

12. The method of claim 1, further comprising sharing any excess BE bandwidth between users such that a maximum sustainable traffic rate (MSTR) is met for all user types before allowing a particular user's MSTR to be exceeded.

13. A non-transitory computer-readable storage medium comprising computer readable code embodied therein which, when executed by a processor, causes the processor to:

establish at least first and second best effort (BE) user classes (BE1, BE2), for prioritizing and scheduling associated BE traffic flows in the network, wherein the BE1 user class is assigned a higher priority for traffic throughput than the BE2 user class;

assign a first maximum sustainable traffic rate threshold value (MSTR_1) that establishes an upper bound of bandwidth to be allocated to each user in the BE1 user class and assign a first minimum reserved traffic rate threshold value (MRTR_1) that establishes a lower bound of bandwidth to be allocated to each user in the BE1 user class;

assign a second maximum sustainable traffic rate threshold value (MSTR_2) that establishes an upper bound of bandwidth to be allocated to each user in the BE2 user class and assign a second minimum reserved traffic rate threshold value (MRTR_2) that establishes a lower bound of bandwidth to be allocated to each user in the BE2 user class; and establish an initial ratio (BE1:BE2) of throughput for the BE1 user class to throughput for the BE2 user class;

determine, for each of the BE1 and BE2 user classes, whether associated BE traffic has a traffic throughput greater than the respective MRTR_1 or MRTR_2 threshold values;

(a) if the associated BE traffic has a throughput greater than the respective MRTR_1 or MRTR_2 threshold value for all associated service class users such that the network BE traffic is in an uncongested state, the processor:

(1) proportionally allocates any residual bandwidth to the BE1 and BE2 user class traffic in accordance with the initial ratio (BE1:BE2) if all classes of BE user traffic are at least at their associated maximum sustained throughput rate (MSTR) threshold values, or (2) increases allocated bandwidths for all BE1 users in the BE1 user class to a traffic rate at least equal to the MSTR_1 level before increasing a traffic rate for any lower priority service class user;

(b) if the associated BE traffic has a throughput less than or equal to the respective MRTR_1 or MRTR_2 threshold value for any associated service class user such that the network BE traffic is in a congested state, the processor:

(1) estimates a traffic throughput degradation;

(2) if the BE1 service class traffic rate is less than the MRTR_1 threshold value for any BE1 service user, increases any deficient BE1 user traffic rate by at least a portion of the estimated throughput degradation sufficient to provide BE1 user traffic at least at the MRTR_1 level and reduce lower priority service user traffic as necessary, (3) if the BE1 service class traffic rate is at least at the MRTR_1 threshold value for all BE1 service users and if the BE2 service class traffic rate is less than the MRTR_2 threshold value for any BE2 service user, maintains the BE1 service class traffic rates and increase any deficient BE2 user traffic rate by at least a portion of the estimated throughput degradation sufficient to provide BE2 user traffic at least at the MRTR_2 level and reduce any lower priority service user traffic as necessary.

* * * * *